US010237458B2

(12) United States Patent
Lim et al.

(10) Patent No.: US 10,237,458 B2
(45) Date of Patent: Mar. 19, 2019

(54) FILTER SWITCHING DEVICE USED FOR CAMERA MODULE AND MOBILE DEVICE INCLUDING CAMERA MODULE

(71) Applicant: MICRO ACTUATOR CO., LTD., Yongin-si, Gyeonggi-do (KR)

(72) Inventors: Dae-soon Lim, Yongin-si (KR); Hak-ku Yoon, Suwon-si (KR); Myung-won Choi, Yongin-si (KR)

(73) Assignee: MICRO ACTUATOR CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/558,041

(22) PCT Filed: Mar. 16, 2016

(86) PCT No.: PCT/KR2016/002662
§ 371 (c)(1),
(2) Date: Sep. 13, 2017

(87) PCT Pub. No.: WO2016/148512
PCT Pub. Date: Sep. 22, 2016

(65) Prior Publication Data
US 2018/0069995 A1 Mar. 8, 2018

(30) Foreign Application Priority Data

Mar. 16, 2015 (KR) .................. 10-2015-0036182
Jul. 15, 2015 (KR) .................. 10-2015-0100566

(51) Int. Cl.
*H04N 5/225* (2006.01)
*G02B 7/09* (2006.01)
(Continued)

(52) U.S. Cl.
CPC ............. *H04N 5/2254* (2013.01); *G02B 5/20* (2013.01); *G02B 7/006* (2013.01); *G02B 7/09* (2013.01);
(Continued)

(58) Field of Classification Search
CPC ............. H04N 5/2254; H04N 5/23245; H04N 5/2257; H04N 5/262; H04N 5/232;
(Continued)

(56) References Cited

U.S. PATENT DOCUMENTS

| 7,156,564 | B2 | 1/2007 | Watanabe et al. | |
| 8,164,673 | B2 * | 4/2012 | Horie | G02B 5/22 348/335 |

(Continued)

FOREIGN PATENT DOCUMENTS

| CN | 103713445 | 4/2014 |
| JP | 08-116478 | 5/1996 |

(Continued)

OTHER PUBLICATIONS

International Search Report for PCT/KR2016/002662 dated Jul. 29, 2016, 2 pages.

(Continued)

*Primary Examiner* — Padma Haliyur
(74) *Attorney, Agent, or Firm* — Nixon & Vanderhye, P.C.

(57) ABSTRACT

A filter switching device used for a camera module and a mobile device that includes a camera module are disclosed. The disclosed filter switching device used for a camera module comprises: a base having a light passage hole formed therein;
a filter blade unit that is coupled to the base to rotate about the reference axis of the base and includes a plurality of filters; and (Continued)

a driving unit that rotates the filter blade unit using a magnetic force, wherein one of the plurality of filters is set to the position
corresponding to the light passage hole when the filter blade unit rotates by a preset angle in a first direction, and another filter is
set to the position corresponding to the light passage hole when the filter blade unit rotates by a preset angle in a second direction
that is opposite to the first direction.

15 Claims, 26 Drawing Sheets

(51) Int. Cl.
| | |
|---|---|
| *G02B 5/20* | (2006.01) |
| *H04N 5/232* | (2006.01) |
| *H04N 5/262* | (2006.01) |
| *G02B 7/00* | (2006.01) |
| *G02B 13/00* | (2006.01) |
| *G03B 11/00* | (2006.01) |
| *G03B 42/00* | (2006.01) |
| *G06K 9/00* | (2006.01) |
| *H04N 5/33* | (2006.01) |
| *G02B 26/02* | (2006.01) |
| *G03B 3/10* | (2006.01) |
| *G03B 7/00* | (2014.01) |

(52) U.S. Cl.
CPC ....... *G02B 13/0055* (2013.01); *G02B 26/023* (2013.01); *G03B 11/00* (2013.01); *G03B 42/00* (2013.01); *G06K 9/00604* (2013.01); *H04N 5/2257* (2013.01); *H04N 5/232* (2013.01); *H04N 5/23245* (2013.01); *H04N 5/262* (2013.01); *H04N 5/33* (2013.01); *G02B 5/208* (2013.01); *G03B 3/10* (2013.01); *G03B 7/00* (2013.01)

(58) Field of Classification Search
CPC .......... H04N 5/33; G02B 26/023; G02B 5/20; G02B 13/0055; G02B 7/006; G02B 7/09; G06K 9/00604; G03B 7/00; G03B 42/00; G03B 11/00
See application file for complete search history.

(56) References Cited

U.S. PATENT DOCUMENTS

| | | | |
|---|---|---|---|
| 8,200,079 B2 | 6/2012 | Seo | |
| 8,248,692 B2* | 8/2012 | Wu | ........................ G02B 5/208 |
| | | | 359/350 |
| 2008/0143868 A1 | 6/2008 | Tsuchiya et al. | |

FOREIGN PATENT DOCUMENTS

| | | |
|---|---|---|
| JP | 2003-259167 | 9/2003 |
| JP | 2004-120075 | 4/2004 |
| JP | 2004-205967 | 7/2004 |
| JP | 2005-091656 | 4/2005 |
| JP | 2007-140388 | 6/2007 |
| JP | 3956724 | 8/2007 |
| JP | 2008-152032 | 7/2008 |
| JP | 2011-107600 | 6/2011 |
| KR | 10-2007-0065700 | 6/2007 |
| KR | 10-2008-0112822 | 12/2008 |
| KR | 10-2011-0044396 | 4/2011 |
| KR | 10-1034061 | 5/2011 |

OTHER PUBLICATIONS

Written Opinion of the ISA with English Translation for PCT/KR2016/002662 dated Jul. 29, 2016, 13 pages.
KR Office Action for KR Patent Application No. 10-2015-0036182 (5 pages), dated Nov. 7, 2016 with English Translation of KR Office Action (7 pages).
KR Office Action for KR Patent Application No. 10-2015-0036182 (9 pages), dated May 30, 2017 with English Translation (13 pages).
KR Office Action for Kr Patent Application No. 10-2015-0100566 (6 pages), dated Mar. 15, 2016 with English Translation (7 pages).
KR Decision to Grant a Patent for KR Patent Application No. 10-2015-0100566 (2 pages), dated Jun. 24, 2016 with English Translation (2 pages).
Office Action dated Aug. 1, 2018 in counterpart Chinese Patent Application No. 201610150893.7 and English-language translation of same.
Office Action dated Sep. 25, 2018 in counterpart Japanese Patent Application No. 2018-500256 and English-language translation of same.

* cited by examiner

FILTER SWITCHING DEVICE USED FOR CAMERA MODULE AND MOBILE DEVICE INCLUDING CAMERA MODULE

This application is the U.S. national phase of International Application No. PCT/KR2016/002662 filed Mar. 16, 2016 which designated the U.S. and claims priority to KR Patent Application No. 10-2015-0036182 filed Mar. 16, 2015 and KR Patent Application No. 10-2015-0100566 filed Jul. 15, 2015, the entire contents of each of which are hereby incorporated by reference.

TECHNICAL FIELD

Apparatuses consistent with the present disclosure relate to filter switching device used for a camera module and a mobile device including the camera module, and more particularly, to a filter switching device used for a camera module in which one filter blade part rotates to selectively dispose a filter in front of a lens, and a mobile device including the camera module.

BACKGROUND ART

A mobile device such as a smartphone or a tablet PC which is recently and widely used includes a camera module.

Such a camera module is used for photographing of a moving image, photographing of a still image of an object, a character, or the like, biometrics, and the like.

In a case in which the photographing of the moving image or the photographing of the still image is performed, since an image sensor of a camera is sensitive to infrared rays, which are invisible rays, an infrared cut-off filter that cuts-off the infrared rays is positioned in front of a lens in the daytime and is not positioned in front of the lens at night, such that the infrared rays are actively transmitted to photograph a subject even in an environment with less visible ray.

In addition, in a biometrics field such as iris recognition, or the like, a separate camera that transmits a portion of an infrared region and a visible ray region is used to photograph bio-information of an iris.

Since such a conventional configuration has a complex configuration for driving the filter and increases an entire size of a product, it was difficult to apply to a mobile device.

DISCLOSURE

Technical Problem

The present disclosure provides a filter switching device used for a camera module which has a small size and is compact and which is applicable to a thin mobile device by a filter blade part which simplifies a configuration for driving a filter, has at least one filter, and is provided to be horizontally movable, and a mobile device including the camera module.

Technical Solution

According to an aspect of the present disclosure, a filter switching device used for a camera module includes a base configured to have a light passing hole formed in the base; a filter blade part configured to be rotatably coupled to a reference shaft of the base and include at least one filter; and a driving part configured to rotate the filter blade part by magnetic force, wherein the filter blade part rotates by a predetermined angle in a first direction or a second direction opposite to the first direction to change a photographing mode.

The filter blade part may include a first filter and a second filter, when the filter blade part rotates by the predetermined angle in the first direction, the first filter may be set to a position corresponding to the light passing hole, and when the filter blade part rotates by the predetermined angle in the second direction, the second filter may be set to the position corresponding to the light passing hole.

The first filter may be any one of an infrared cut-off filter, a band-pass filter, and a glass, and the second filter may be any one of the infrared cut-off filter, the band-pass filter, and the glass, which is different from that of the first filter.

The filter blade part may include a filter blade configured to have the at least one filter disposed at one end of the filter blade; and a cam hole configured to be formed at the other end opposite to one end of the filter blade and rotatably coupled to the reference shaft.

The driving part may include a magnet configured to be provided to the other end of the filter blade; and an electromagnet configured to have both ends disposed to be adjacent to the magnet.

The magnet may be positioned to be adjacent to the reference shaft.

The electromagnet may include a coil in which a current selectively flows; and a yoke having the coil disposed at a portion of the yoke and selectively magnetized by the coil, and the yoke may be formed in a bent shape so that portions at which both ends of the electromagnet are disposed and the portion at which the coil is disposed are each disposed on different surfaces of the base.

Both ends of the electromagnet may be formed to correspond to an outer circumference surface of the magnet.

The driving part may rotate the filter blade part by attractive force or repulsive force with the magnet according to a change in polarities of both ends of the electromagnet.

The magnet may be divided into an N pole and an S pole at a boundary of a virtual plane including a central axis of the reference shaft.

The at least one filter may move on a circumference of a virtual circle having the reference shaft as a center and having a diameter from the reference shaft to a center of the light passing hole.

According to another aspect of the present disclosure, a mobile device including a camera module includes the filter switching device described above, wherein the filter switching device is included in the camera module.

The camera module may include a lens transfer part and a lens part that forwardly moves and backwardly moves along the lens transfer part, and the filter switching device may be disposed in front of the camera module.

The lens transfer part may be formed at a height which is lower than a front surface of the lens part based on an initial position of the lens part to secure a space in which the driving part of the filter switching device rotates, and form a step with a front surface of the lens transfer part.

According to another aspect of the present disclosure, a filter switching device used for a camera module includes an upper cover configured to have a light passing hole formed in the upper cover; a filter blade part configured to include at least a first filter and a second filter; and one driving part configured to horizontally move the filter blade part. The filter blade part may be connected to the one driving part so that the first filter and the second filter are disposed on the light passing hole while not interfering with each other.

The filter blade part may simultaneously include a first lens corresponding to the first filter or a second lens corresponding to the second filter, and may be designed to be moved together with the first lens or the second lens when the first filter or the second filter moves.

Advantageous Effects

According to the filter switching device according to an exemplary embodiment of the present disclosure as described above, the driving part is disposed on one side of the base and the single filter blade part having at least one filter is disposed to be horizontally moved on the base to reduce the height of the filter switching device, thereby making it possible to compactly manufacture the filter switching device, and as a result, the filter switching device may be applied to the mobile device having the small size and the thin thickness.

Further, the filter switching device according to an exemplary embodiment of the present disclosure includes the filter blade part in which at least one filter is coupled to the single filter blade, thereby making it possible to simplify the entire structure of the filter switching device, and since the operation error of the filter blade part may be prevented in advance by removing interference with other members at the time of rotating the filter blade part, reliability of the product may be improved.

Further, since the filter switching device according to an exemplary embodiment of the present disclosure switches the lens corresponding to the filter when the filter is switched, it is possible to provide an angle of view suitable for each of the filters.

BEST MODE

Hereinafter, a filter switching device used for a camera module and a mobile device including the camera module according to an exemplary embodiment of the present disclosure will be described in detail with reference to the accompanying drawings. It is to be understood that exemplary embodiments described below are illustratively provided to facilitate understanding of the present invention, and the present invention may be variously modified and embodied other than the exemplary embodiments described herein. However, in the following description, a detailed description of known functions and configurations incorporated herein will be omitted when it may make the subject matter of the present invention unclear. In addition, the accompanying drawings are not drawn to scale to facilitate understanding of the present invention, but the dimensions of some of the components may be exaggerated.

A filter switching device according to an exemplary embodiment of the present disclosure may be applied to a mobile device including a camera module, such as a smartphone, a tablet PC, or the like.

Hereinafter, a smartphone will be described as an example of a mobile device to which the present disclosure may be applied.

Figure 1:
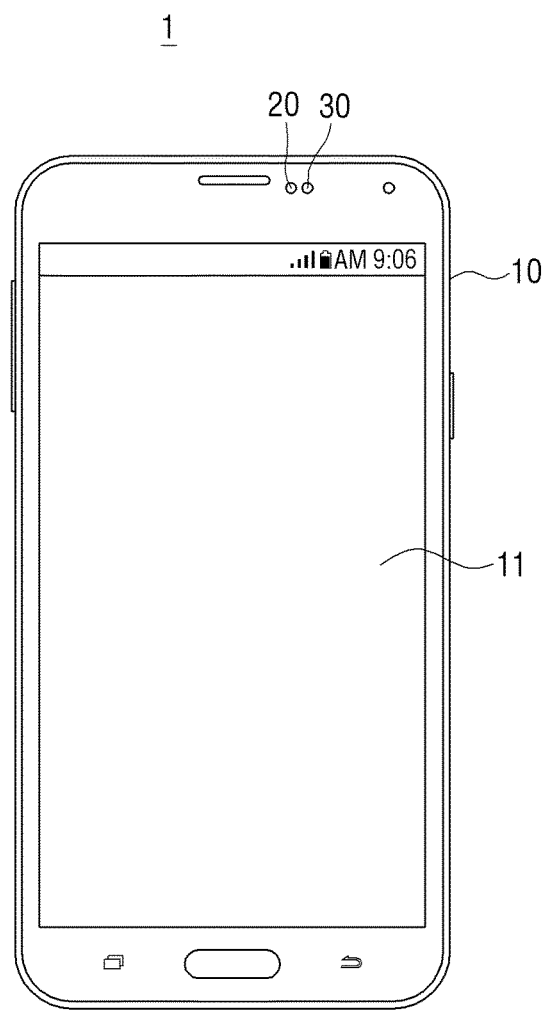
FIG. 1 is a plan view illustrating the front of a mobile device according to an exemplary embodiment of the present disclosure.
Figure 2:
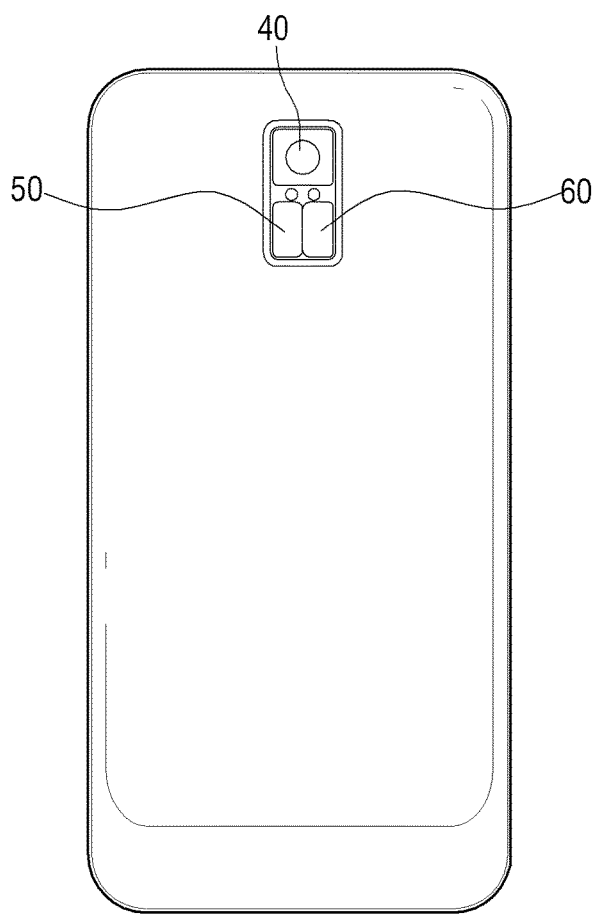
FIG. 2 is a plan view illustrating the rear of the mobile device according to an exemplary embodiment of the present disclosure.

Referring to FIGS. 1 and 2, a smartphone 1 includes a housing 10, a communicator 20, a front camera module 30, a rear camera module 40, a flash 50, and a near-infrared light emitting diode (LED) 60.

The housing 10 forms an outer shape of the smartphone 1, and a display 11 for outputting various data is provided on a front surface of the housing 10. As the display 11, a liquid crystal display (LCD), an organic light emitting diode (OLED), or the like may be used. Various kinds of printed circuit boards (not shown) including a controller (not shown) is installed in the housing 10 so that the smartphone 1 may perform various functions. Since the printed circuit board or the controller installed in the housing 10 as described above is the same as or similar to those used for a smartphone according to the related art, a detailed description thereof will be omitted.

The communicator 20 is provided to one side of an upper portion of the front surface of the housing 10. The communicator 20 allows various devices using an infrared remote controller such as a television, an audio, and a set-top box to be operated by the smartphone by infrared rays. Since the communicator 20 may not be provided depending on the kind of the smartphone, a detailed description thereof will be omitted.

Meanwhile, although not illustrated, the near-infrared LED is provided to the position to which the communicator 20 is provided, or one side of the communicator 20, thereby making it possible to perform a night photographing.

The front camera module 30 is positioned at one side of the communicator 20. The front camera module 30 may be used for self-photographing, or used for iris recognition. In recent years, smartphone cradles (selfie sticks) are widely used for self-photographing. Accordingly, usability of the front camera module 30 is also increased as much as the rear camera module 40.

The front camera module 30 includes a cover glass (not shown), an auto-focusing lens (not shown), an image sensor (not shown), and a printed circuit board (not shown). Since a cover glass, an auto-focusing lens, an image sensor, and a printed circuit board may be the same as those used in the smartphone according to the related art, a detailed description thereof will be omitted.

The rear camera module 40 is installed on a rear surface of the housing 10. Since most of the configurations of the rear camera module 40 are the same as those of the front camera module 30, a detailed description thereof will be omitted.

The flash 50 may be formed at one side of the rear camera module 40. In addition, the near-infrared LED 60 may be provided to one side of the flash 50. In a case in which the photographing is performed in an infrared mode at the night, since the near-infrared LED 60 may emit near-infrared rays to illuminate a subject which is in a dark place, an infrared photographing is possible.

Figure 3:
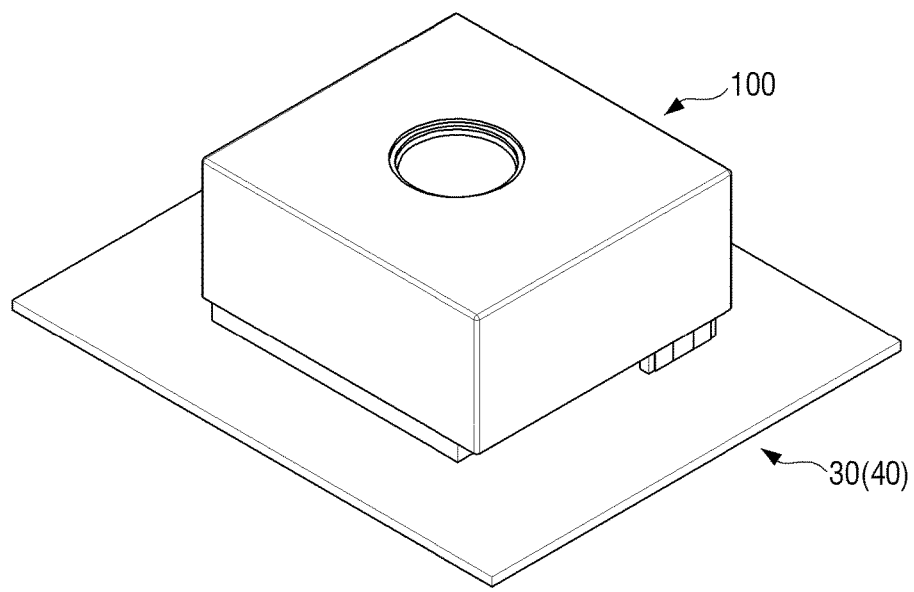
FIG. 3 is a perspective view illustrating a camera module including a filter switching device used for the mobile device according to an exemplary embodiment of the present disclosure.

Referring to FIG. 3, the filter switching device 100 is provided to surround the front camera module 30 or the rear camera module 40 in a direction of the subject in the front camera module 30 or the rear camera module 40. The filter switching device 100 will be described below in detail.

Figure 4:
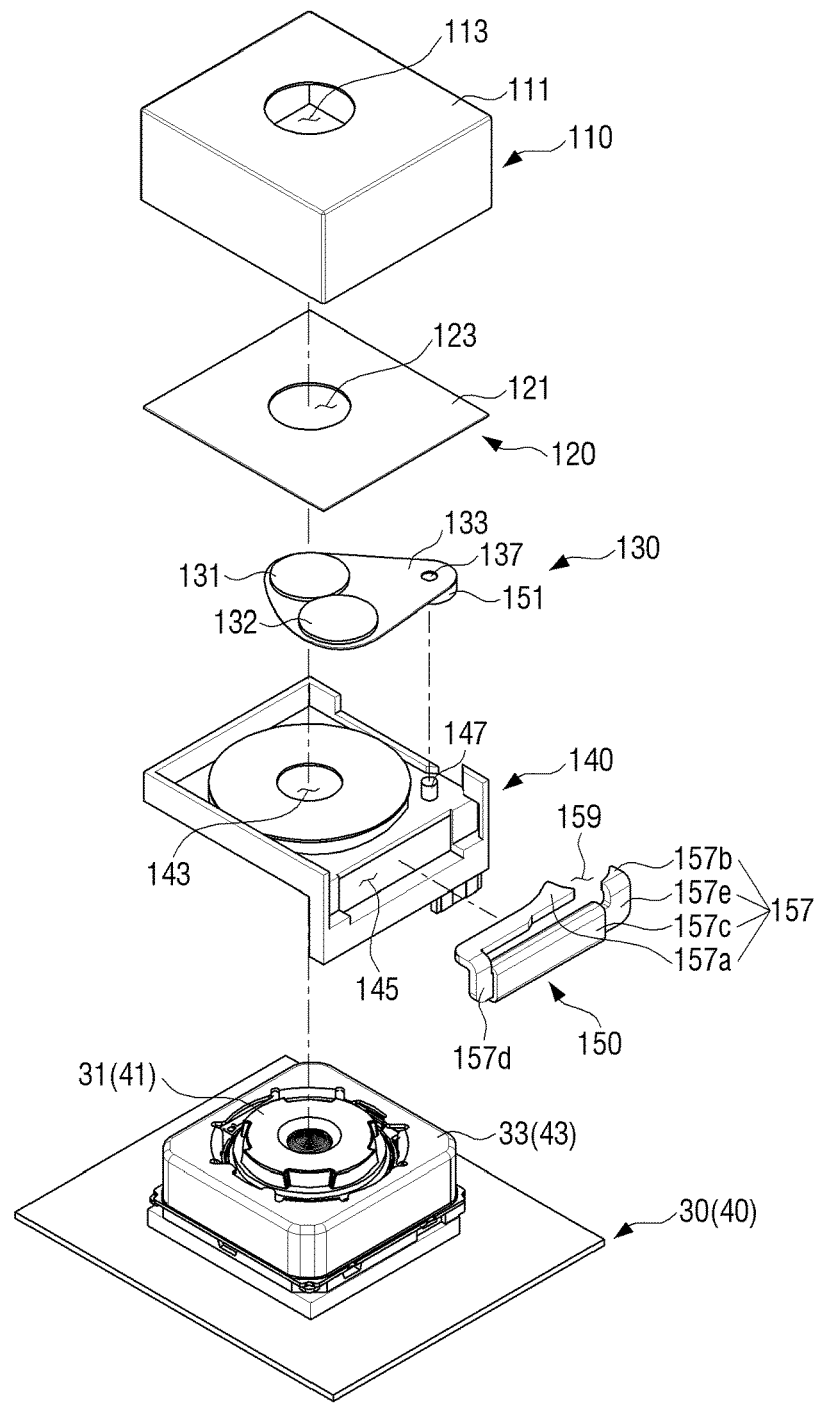
FIG. 4 is an exploded perspective view of a camera module including a filter switching device according to an exemplary embodiment of the present disclosure.
Figure 5:
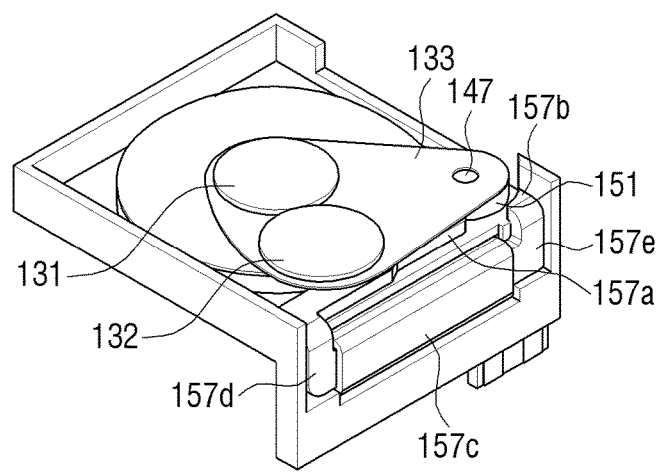
FIG. 5 is a perspective view illustrating a case in which a cover is separated from the filter switching device according to an exemplary embodiment of the present disclosure.

Referring to FIGS. 4 and 5, the filter switching device 100 includes an outer cover 110, an inner cover 120, a filter blade part 130, a base 140, and a driving part 150.

The outer cover 110 is configured to surround the front camera module 30 or the rear camera module 40. The outer cover 110, which has a rectangular parallelepiped shape, includes a front cover 111 and a first light passing hole 113. The front cover 111 forms an outer surface in front of the filter switching device 100 which is closest to the subject. The first light passing hole 113 is formed in approximately a circular shape in a central portion of the front cover 111. The first light passing hole 113 allows light of the subject to pass therethrough.

The inner cover 120 is disposed between the front cover 111 and the base 140, and serves to surround and protect the filter blade part 130. A first cover 121 corresponding to the front cover 111 is also formed on the inner cover 120, and a second light passing hole 123 through which the light passing through the first light hole 113 passes is formed in the inner cover 120. Preferably, the second light passing hole 123 may include a cover glass (not shown) to protect the filter blade part 130. It is also possible to integrally form the inner cover 120 with the outer cover 110. Accordingly, an assembling process of the filter switching device 100 may be simplified.

The filter blade part 130 is coupled to the base 140 so as to rotate at a predetermined angle about a reference shaft 147 of the base 140. The filter blade part 130 includes a first filter 131, a second filter 132, a filter blade 133, and a cam hole 137.

The first filter 131 and the second filter 132 may be selectively set to positions corresponding to the first and second light passing holes 113 and 123. In this case, the first and second filter 131 and 132 selectively covers the first and second light passing holes 113 and 123. Further, the first and second filters 131 and 132 may be any one of an infrared cut-off filter and a band-pass filter for recognizing an iris.

Specifically, since the front camera module 30 is mainly used to recognize the iris, any one of the first filter 131 and the second filter 132 of the filter blade part 130 disposed in the front camera module 30 may use the band-pass filter that may recognize the iris, and the other thereof may use the infrared cut-off filter to perform the photographing in the daytime. On the other hand, since the rear camera module 40 is mainly used for photographing at the night, any one of the first filter 131 and the second filter 132 of the filter blade part 130 disposed in the rear camera module 40 may use the infrared cut-off filter to perform the photographing in the daytime, and the other thereof may use the band-pass filter or the glass to perform the photographing at the night.

In addition, the first filter 131 and the second filter 132 may be configured as different filters to provide various functions as needed. Specifically, if the first filter 131 is the infrared cut-off filter, the second filter 132 may be the band-pass filter, and if the first filter 131 is the band-pass filter, the second filter 132 may be the infrared cut-off filter. Further, the first filter 131 or the second filter 132 may also be formed of only the glass without the filter.

In addition, the first and second filter 131 and 132 may have the reference shaft 147 as a center thereof, and may be provided to be moved on a circumference of a virtual circle having a diameter which is from the reference shaft 147 to a center of the third light passing hole 143. Such a circumference of a virtual circle may correspond to a rotational trajectory of the filter blade 133. As such, the filter blade 133 includes at least one filter, thereby making it possible to provide various photographing modes.

Although not illustrated, the first filter 131 or the second filter 132 may have a first lens or a second lens which corresponds to each of the first and second filters and is provided to the same position as the first filter or the second filter.

For example, in a case in which the second filter 132 is the band-pass filter, a narrow-angle lens is provided together with the second filter, thereby making it possible to more precisely perform the photographing of the iris.

Figure 6:
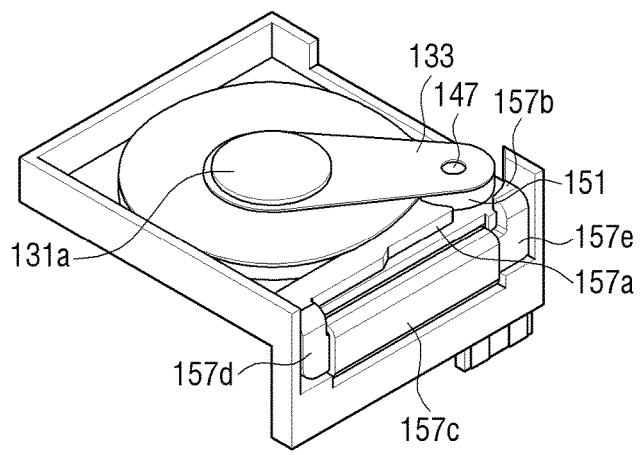
FIG. 6 is a perspective view illustrating a case in which only one filter is included in the filter switching device of FIG. 5.

On the other hand, as illustrated in FIG. 6, the filter blade part 130 may include only a first filter 131a. In this case, the first filter 131a selectively covers the first and second light passing holes 113 and 123. That is, the third light passing hole 143 may be covered by the first filter 131a and indirectly exposed to the first and second light passing holes 113 and 123, or may not be covered by the first filter 131a and directly exposed to the first and second light passing holes 113 and 123. Such a first filter 131a may be any one of the infrared cut-off filter and the band-pass filter.

The case in which the filter blade part 130 includes only one first filter 131 as described above may obtain the same effect as the case in which any one of the first and second filters 131 and 132 is formed of the glass in the case in which the filter blade part 130 has the first and second filters 131 and 132 as illustrated in FIG. 5.

The filter blade 133 rotates in a clockwise direction or a counterclockwise direction about the reference shaft 147 by a magnet 151 that is rotated by an electromagnet 157. The filter blade 133 is formed in a thin plate shape. The first and second filters 131 and 132 are formed on one end of the filter blade 133, and the cam hole 137 and the magnet 151 which are coupled to the reference shaft 147 are formed on the other end thereof. Further, as illustrated in FIG. 6, it is also possible for the filter blade 133 to include only the first filter 131a.

The cam hole 137 is positioned in the other end of the filter blade 133, and is formed in a circular hole so as to be rotatably coupled to the reference shaft 147.

The filter blade part 130 described above rotates by a predetermined angle on the reference shaft 147 as a rotation shaft so that the first and second filters 131 and 132 may be selectively positioned on the first and second light passing holes 113 and 123. That is, when the first filter 131 is positioned on the first and second light passing holes 113 and 123, the second filter 132 is not positioned on the first and second light passing holes 113 and 123, and when the second filter 132 is positioned on the first and second light passing holes 113 and 123, the first filter 131 is not positioned on the first and second light passing holes 113 and 123.

Since such first and second filters 131 and 132 are provided at the same height, it is possible to reduce an overall height of the filter switching device 100 as compared to the related art in which a plurality of filters are formed in a vertical direction. Accordingly, it is possible to compactly configure the filter switching device 100.

Further, since the first and second filters 131 and 132 are included in one filter blade 133, the filter switching device 100 may be stably used for a long period of time without minor breakdowns by basically removing the possibility that the filters interfere with each other in a filter switching process.

The base 140 forms a lower portion of the filter switching device 100 and includes the third light passing hole 143, an electromagnet mounting part 145, and the reference shaft 147.

The third light passing hole 143 is formed in approximately a circular shape, and is provided to have a central axial that coincides with central axes of the first and second light passing holes 113 and 123 so that light may pass therethrough.

The electromagnet 157 is mounted on the electromagnet mounting part 145. The electromagnet mounting part 145 may have a substantially rectangular shape with one side being omitted, but is not limited thereto, and any shape may be possible as long as the electromagnet 157 may be mounted thereon.

The reference shaft 147 is formed to be adjacent to one corner which is adjacent to a portion over the base 140 on which the electromagnet 157 is disposed. Specifically, the reference shaft 147 is provided to a portion in which a magnet accommodating part 159 of the driving part 150 is formed. Such a reference shaft 147 is coupled to the cam hole 137 of the filter blade part 130 and the magnet 151. The reference shaft 147 may be formed in a substantially cylindrical shape so that a circular cam hole 137 and a hole (not shown) of the magnet 151 may be rotatably coupled thereto.

The driving part 150 includes the magnet 151 and the electromagnet 157 to rotate the filter blade part 130.

The magnet 151, which is a permanent magnet, is disposed below the other end of the filter blade 133, and has a donut shape having a hole (not shown) formed in a center thereof so as to be rotatably coupled to the reference shaft 147. Such a center of the hole is preferably formed to coincide with a center of the cam hole 137. Further, when the magnet 151 is divided in half along a diameter direction, an approximately half of the magnet 151 may have an N pole and the other half may have an S pole. Specifically, the magnet 151 is divided into the N pole and the S pole at a boundary of a virtual plane including the central axis of the reference shaft 147, and the N pole and the S pole may be each provided in an arch shape. Such a magnet 151 may rotate about the reference shaft 147 by magnetic force with the electromagnet 157.

The electromagnet 157 has a substantially U shape, and is provided in a shape in which one end 157a thereof is extended to the other end 157b thereof along one side of the base 140. Here, one end 157a and the other end 157b of the electromagnet 157 are spaced apart from each other by a predetermined distance to form the magnet accommodating part 159 in which the magnet 151 may be disposed. That is, the magnet 151 is rotatably coupled to the reference shaft 147 formed in the magnet accommodating part 159.

In addition, the electromagnet 157 include U-shaped yokes 157d and 157e, which are formed of a magnetic material such as iron, and a coil 157c is wound around a center of each of the yokes 157d and 157e. Therefore, when a current is applied to the coil 157c, the U-shaped yokes 157d and 157e of the electromagnet 157 are magnetized to apply attractive force or repulsive force to the magnet 151. Here, cross sections of one end 157a and the other end 157b of each of the yokes 157d and 157e are preferably provided in a shape that corresponds to a shape of an outer circumference surface of the magnet 151, so as to face the magnet 151 while having the same area as each other and as wide as possible.

Further, the yokes 157d and 157e may have a shape which is bent by about 90° so that the coil 157c is disposed on one side of the base 140 and both end portions 157a and 157b are disposed on a top surface of the base 140. Depending on such a shape, the filter switching device 100 according to the present disclosure may be more compactly implemented.

The front and rear camera modules 30 and 40 include front and rear lens transfer parts (VCM) 33 and 43 that perform a zooming or a focusing by transferring the front and rear lens parts 31 and 41 in an optical axis direction.

Hereinafter, an operation of the filter switching device 100 according to an exemplary embodiment of the present disclosure having the structure described above will be described with reference to FIGS. 5, 7A, and 7B. Hereinafter, for convenience of explanation, the description will be made by limiting that the filter switching device 100 is installed in the front camera module 30, the band-pass filter is used as the first filter 131, and the infrared cut-off filter is used as the second filter 132. Further, it is illustrated that a first pole 151*a* of the magnet 151 has an N pole, and a second pole 151*b* of the magnet 151 has an S pole.

Figure 7A:
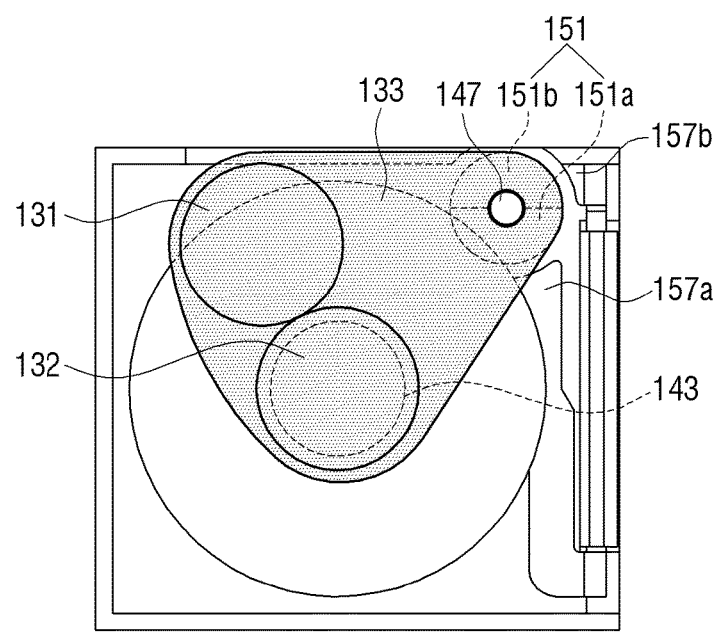
FIG. 7A is a plan view illustrating a case in which a second filter is positioned on a light passing hole in the filter switching device of FIG. 5.

In a general case, the infrared cut-off filter 132 is positioned on the first and second light passing holes 113 and 123 as illustrated in FIG. 7A.

In this state, when the iris recognition is performed for identification, or the like, an iris recognition mode is selected. A method for selecting an iris recognition mode may be illustrated as follows. When a user executes a camera application on the display 11 of the smartphone 1, a screen capable of selecting a camera mode is displayed on the display 11. Accordingly, the user may touch the display 11 to select the iris recognition mode. Here, when the user selects the iris recognition mode on the display 11, the filter switching device 100 operates in the iris recognition mode.

Other than the method for selecting the iris recognition mode using the camera application described above, the iris recognition mode may be selected by a dedicated button or key, and since such methods are known methods, a detailed description thereof will be omitted.

Referring to FIG. 7A, one end 157*a* of the electromagnet 157 is magnetized to the S pole, and the other end 157*b* thereof is magnetized to the N pole. Accordingly, one end 157*a* of the electromagnet 157 attracts the N pole of the magnet 151, and the other end 157*b* of the electromagnet 157 attracts the S pole of the magnet 151. Accordingly, the infrared cut-off filter 132 is positioned on the first and second light passing holes 113 and 123, and the band-pass filter 131 deviates from the first and second light passing holes 113 and 123.

In a case in which the iris recognition mode starts in this state, the controller (not shown) causes a current to flow in a direction opposite to the coil 157*c* of the electromagnet 157. Accordingly, one end 157*a* of the electromagnet 157 is magnetized to the N pole and the other end 157*b* thereof is magnetized to the S pole. As the poles of one end 157*a* and the other end 157*b* of the electromagnet 157 are changed as described above, one end 157*a* of the electromagnet 157 pushes the N pole of the magnet 151 and the other end 157*b* thereof attracts the N pole of the magnet 151.

By the magnetization of one end 157*a* and the other end 157*b* of the electromagnet 157, the magnet 151 is rotated, and by such a rotation of the magnet 151, the filter blade 133 is rotated about the center of the reference shaft 147. Accordingly, the first filter 131, which is the band-pass filter, is positioned on the first and second light passing holes 113 and 123, and the second filter 132, which is the infrared cut-off filter, is positioned at a position which deviates from the first and second light passing holes 113 and 123. By such an arrangement, the smartphone 1 recognizes the iris, thereby making it possible to perform identification.

When the user again selects a general photographing mode, that is, a mode in which the second filter 132, which is the infrared cut-off filter, is positioned on the first and second light passing holes 113 and 123 from the iris recognition mode, the controller again applies a current of an opposite direction to the coil 157*c* of the electromagnet 157. Accordingly, as illustrated in FIG. 7A, the second filter 132, which is the infrared cut-off filter, is positioned on the first and second light passing holes 113 and 123, and the first filter 131, which is the band-pass filter, is positioned at a position which deviates from the first and second light passing holes 113 and 123. In the general photographing mode, since the infrared cut-off filter cuts-off the infrared rays and transmits only the visible rays in the day time, image quality may be improved.

According to the present disclosure as described above, the user may set the photographing mode according to a purpose by selectively controlling the band-pass filter or the infrared cut-off filter as needed. In addition, the first filter 131 may be the infrared cut-off filter or a general glass other than the band-pass filter, and the second filter 132 may also be the general glass or the band-pass filter other than the infrared cut-off filter.

Figure 8A:
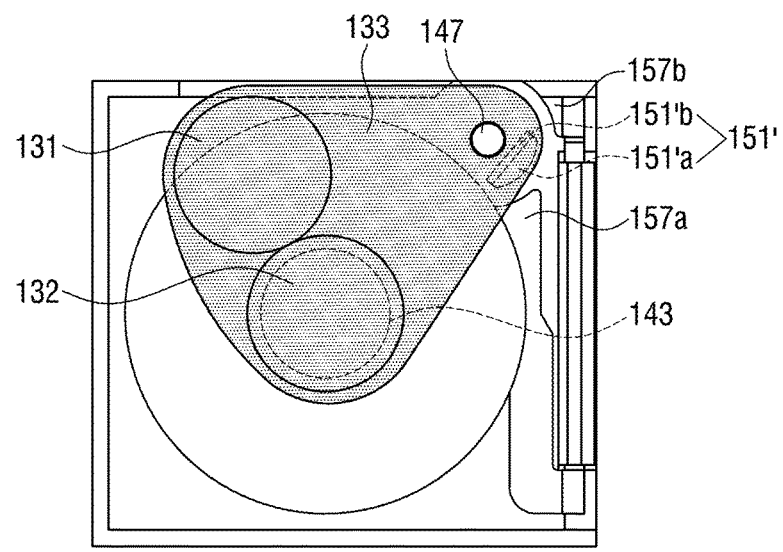
FIG. 8A is a plan view illustrating a case in which the second filter is positioned on the light passing hole in the filter switching device according to a modified example of a magnet illustrated in FIG. 7A.
Figure 8B:
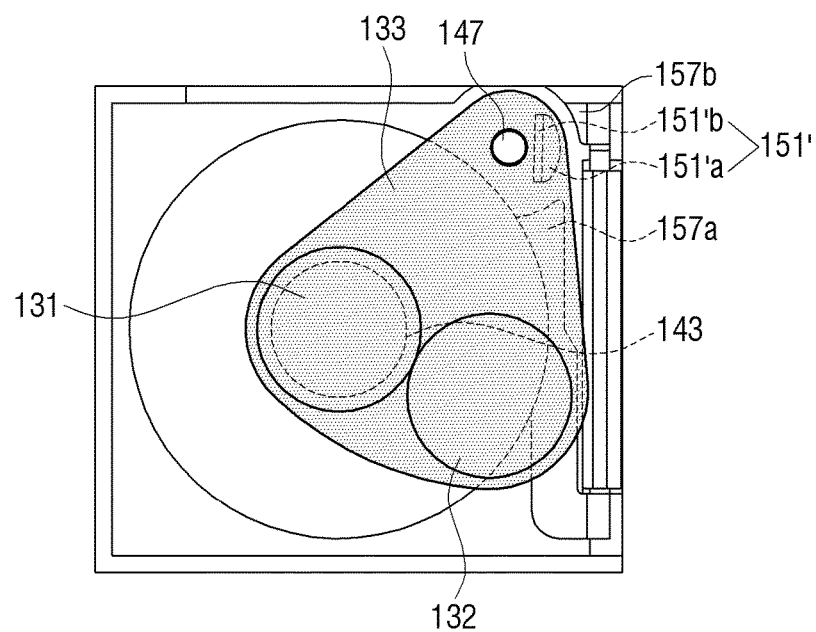
FIG. 8B is a plan view illustrating a case in which the first filter is positioned on the light passing hole in the filter switching device of FIG. 8A.

FIGS. 8A and 8B are plan views that each illustrate cases in which the first and second filters 131 and 132 are positioned on the first and second light passing holes 113 and 123 by a magnet 151' according to a modified example of the magnet 151 illustrated in FIG. 7A.

The magnetic 151' according to the modified example, which is a permanent magnet, may be attached to a lower side of the other end of filter blade 133. Therefore, when the magnet 151' is applied with magnetic force by the electromagnet 157, the magnet 151' may rotate the filter blade 133 about the reference shaft 147.

The magnetic 151' according to the modified example may include a first portion 151'*a* that may face one end 157*a* and the other end 157*b* of each of the yokes 157*d* and 157*e* of the electromagnet 157, and a second portion 151'*b* which is close to the reference shaft 147 at a position opposite to an outer circumference surface of the first portion 151'*a*, and the first portion 151'*a* and the second portion 151'*b* may have different polarities.

The outer circumference surface of the first portion 151'*a* may have an arc shape that corresponds to a cross section of one end 157*a* and the other end 157*b* of each of the yokes 157*d* and 157*e* of the electromagnet 157, and may be uniformly applied with attractive force or repulsive force from each of the yokes 157*d* and 157*e* which are magnetized to different poles accordingly.

Also in an operation of the filter switching device 100 by the magnet 151' according to the modified example similarly to the operation process of the filter switching device 100 described above with reference to FIGS. 7A and 7B, polarity of each of the ends 157*a* and 157*b* of the electromagnet 157 may be changed according to the direction of the current that flows in the coil 157*c* of the electromagnet 157, and each of the ends 157*a* and 157*b* of the electromagnet 157 alternately attracts or pushes the magnet 151'. The filter blade 133 to which the magnet 151' is attached may rotate about the reference shaft 147 by such attractive force and repulsive force, and the first and second filters 131 and 132 may be alternately positioned on the first and second light passing holes 113 and 123 by the rotation of the filter blade 133.

Figure 7B:
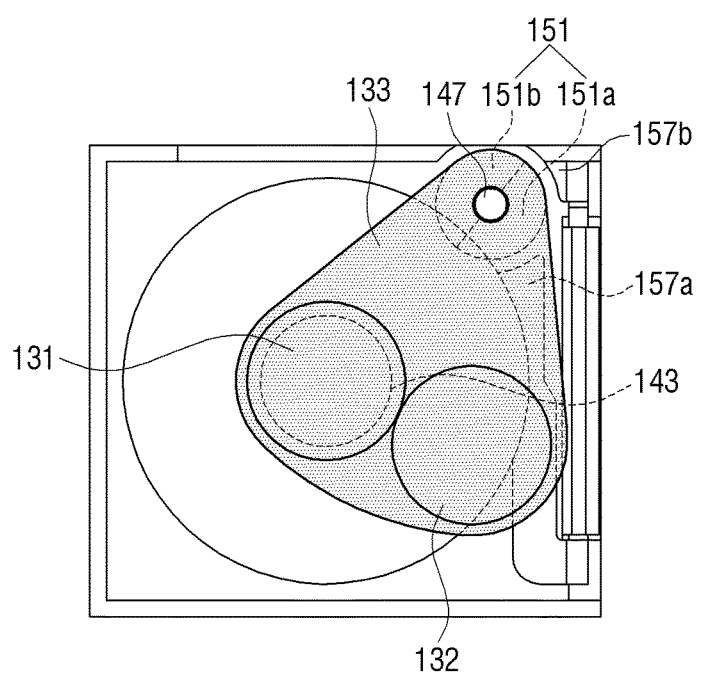
FIG. 7B is a plan view illustrating a case in which a first filter is positioned on the light passing hole in the filter switching device of FIG. 5.

The magnet 151' according to the modified example described above may be manufactured in a minimum size to receive attractive force and repulsive force from each of the yokes 157*d* and 157*e* of the electromagnet 157, thereby making it possible to more reduce weight of the filter switching deice 100 than a case of using the magnet 151 illustrated in FIGS. 7A and 7B. Further, since the magnet 151' is designed to be rotated only according to the change of magnetic property of each of the yokes 157d and 157e of the electromagnet 157, it is possible to prevent the filter switching device 100 from being malfunctioned by external other magnetic forces.

Figure 9:
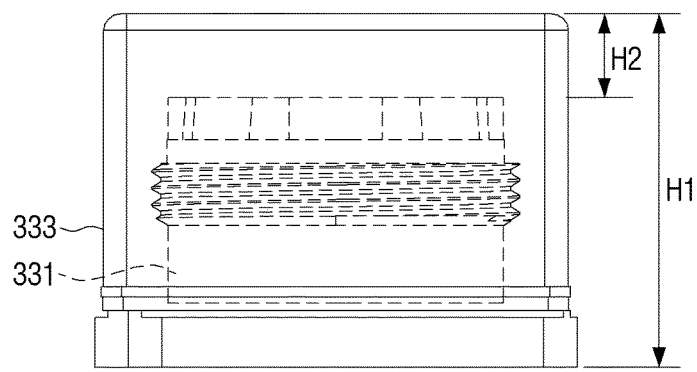
FIG. 9 is a plan view illustrating a camera module according to the related art in which a height of a lens transfer part is higher than a lens part.

Referring to FIG. 9, according to the related art, a height of a lens transfer part 333 is H1 from a lowest end of the camera module, and an interval between an upper end of a lens part 331 and the lens transfer part 333 is H2. In addition, a stroke region of the lens part 331 is equal to or smaller than H2. Accordingly, according to the related art, since the lens transfer part 333 is higher than the lens part 331, the camera module could not be implemented in a small size. In addition, in a case in which the configuration such as the filter switching device is applied to a front surface of the lens part 331, since there is no empty space between the lens part 331 and the lens transfer part 333, an additional volume according to H2 was required.

Figure 10:
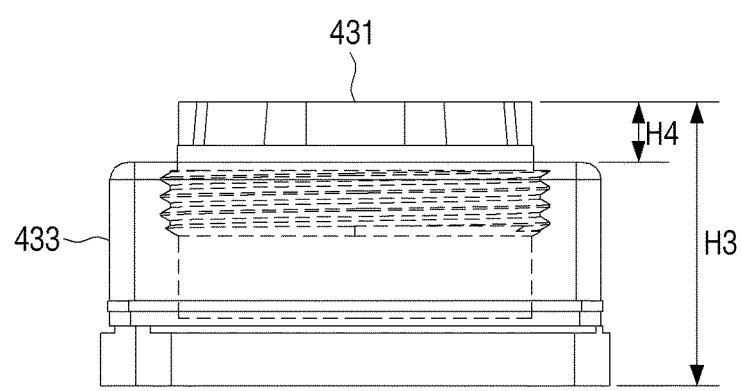
FIG. 10 is a plan view illustrating a camera module according to the present disclosure in which a height of a lens transfer part is lower than a lens part.

Referring to FIG. 10, in the camera module applied to the mobile device according to the present disclosure, a height from the lowest end of the camera module to an initial position of a lens part 431 is H3, and an interval between a lens transfer part 433 and the initial position of the lens part 431 is H4. By such a configuration, the lens part 431 is formed to form a step with a front surface of the lens transfer part 433. Here, the initial position refers to a position at which an interval between the lens part 431 and the uppermost portion of the lens transfer part 433 is minimal when the lens part 431 moves to adjust a focus.

The lens transfer part 433 according to the present disclosure has a height which is lower than the lens part 431. That is, in a case in which an additional configuration such as the filter switching device is applied to the front surface of the camera module, the lens transfer part 433 is formed to have the height which is lower than the front surface of the lens part 431 based on the initial position of the lens part 431 to secure a space of the filter switching device. Accordingly, since the camera module according to the present disclosure may be implemented in entirely low and compact configuration, the camera module is easily applied to the mobile device having many height and size constraints.

In addition, even in a case in which the stroke region of the lens part 331 according to the present disclosure is formed in the same way as the conventional camera module according to FIG. 9, an empty space is formed on an upper portion of the lens transfer part 433, the initial position of the lens part 431, and both sides of the stroke region. Such a space may be utilized as a space in which the electromagnet of the filter switching device is positioned or for the driving of the camera such as the rotation of the magnet. Accordingly, the camera module according to the present disclosure may have improved efficiency of a space use, and may not interfere with other members when the magnet, or the like of the driving part of the filter switching device rotates.

Figure 11:
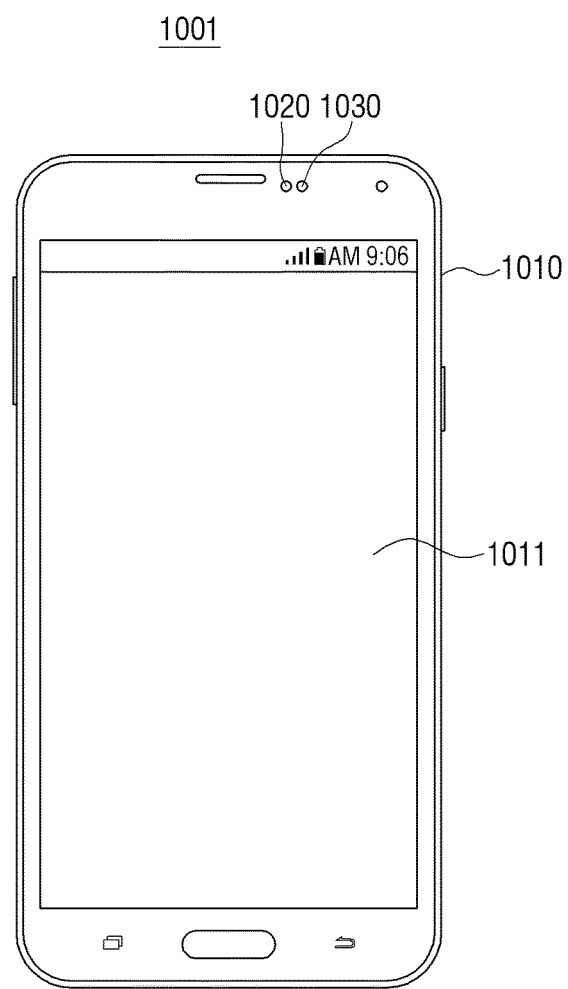
FIG. 11 is a perspective view illustrating the front of a mobile device according to another exemplary embodiment of the present disclosure.
Figure 12:
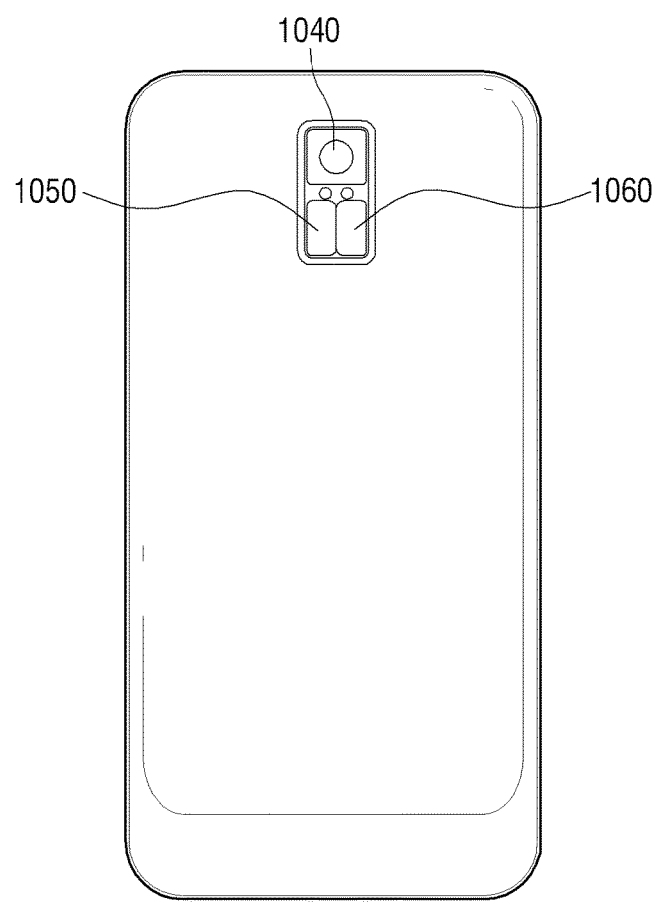
FIG. 12 is a perspective view illustrating the rear of the mobile device according to another exemplary embodiment of the present disclosure.
Figure 13:
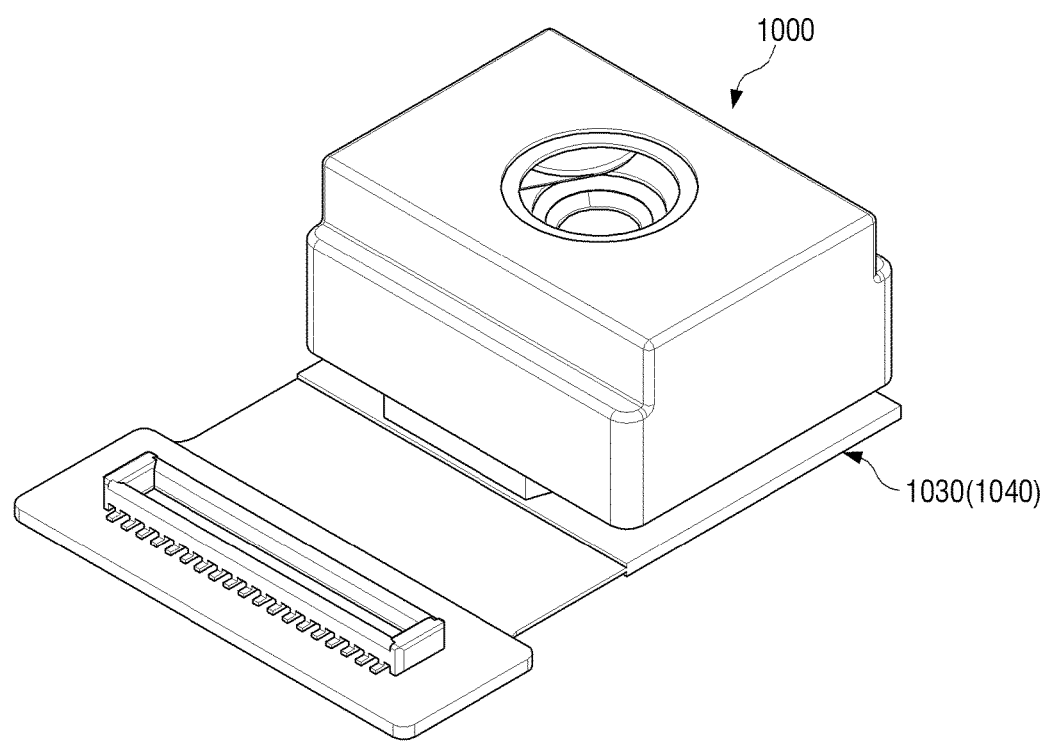
FIG. 13 is a perspective view illustrating a camera module including a filter switching device used for the mobile device according to another exemplary embodiment of the present disclosure.

FIG. 11 is a perspective view illustrating the front of a mobile device, that is, the smartphone, according to another exemplary embodiment of the present disclosure and FIG. 12 is a perspective view illustrating the rear of the smartphone according to another exemplary embodiment of the present disclosure. FIG. 13 is a view illustrating a camera module including a filter switching device used for the mobile device according to another exemplary embodiment of the present disclosure.

Referring to FIGS. 11 and 12, a smartphone 1001 includes a housing 1010, a communicator 1020, a front camera module 1030, a rear camera module 1040, a flash 1050, and a near-infrared light emitting diode (LED) 1060.

The housing 1010 forms an outer shape of the smartphone 1001, and a display 1011 for outputting various data is provided on the front of the housing 1010. As the display 1011, a liquid crystal display (LCD), an organic light emitting diode (OLED), or the like may be used. Various kinds of printed circuit boards (not shown) including a controller (not shown) is installed in the housing 1010 so that the smartphone 1001 may perform various functions. Since the printed circuit board (not shown) or the controller (not shown) installed in the housing 1010 as described above is the same as or similar to those used for a smartphone according to the related art, a detailed description thereof will be omitted.

The communicator 1020 is provided to one side of an upper portion of the front surface of the housing 1010. The communicator 1020 allows various devices using an infrared remote controller such as a television, an audio, and a set-top box to be operated by the smartphone by infrared rays. Since the communicator 1020 may not be provided depending on the kind of the smartphone, a detailed description thereof will be omitted.

Meanwhile, a near-infrared LED (not shown) is installed at a position where the communicator 1020 is provided, or one side of the communicator 1020, thereby making it possible to perform a night photographing.

The front camera module 1030 is positioned at one side of the communicator 1020. The front camera module 1030 may be used for self-photographing, or used for iris recognition. In recent years, smartphone cradles (selfie sticks) are widely used for self-photographing.

Accordingly, usability of the front camera module 1030 is also increased as much as a camera (not shown) of the rear camera module 1040.

The front camera module 1030 is installed with a cover glass (not shown), an auto-focusing lens (not shown), an image sensor (not shown), and a printed circuit board (not shown) on which the image sensor (not shown) is installed. Since such a cover glass (not shown), an auto-focusing lens (not shown), an image sensor (not shown), and a printed circuit board (not shown) on which the image sensor (not shown) is installed may use the same as those used for the smartphone according to the related art, a detailed description thereof will be omitted.

The rear camera module 1040 is installed on a rear surface of the housing 1010. Since most of the configurations of the rear camera module 1040 are the same as those of the front camera module 1030, a detailed description thereof will be omitted.

The flash 1050 may be formed at one side of the rear camera module 1040. In addition, the near-infrared LED 1060 may be provided to one side of the flash 1050. In a case in which the photographing is performed in an infrared mode at the night, since the near-infrared LED 1060 may emit near-infrared rays to illuminate a subject which is in a dark place, an infrared photographing is possible.

Referring to FIG. 13, the filter switching device 1100 is provided to surround the front camera module 1030 or the rear camera module 1040 in a direction of the subject in the front camera module 1030 or the rear camera module 1040. The filter switching device 1100 will be described below in detail.

Figure 14:
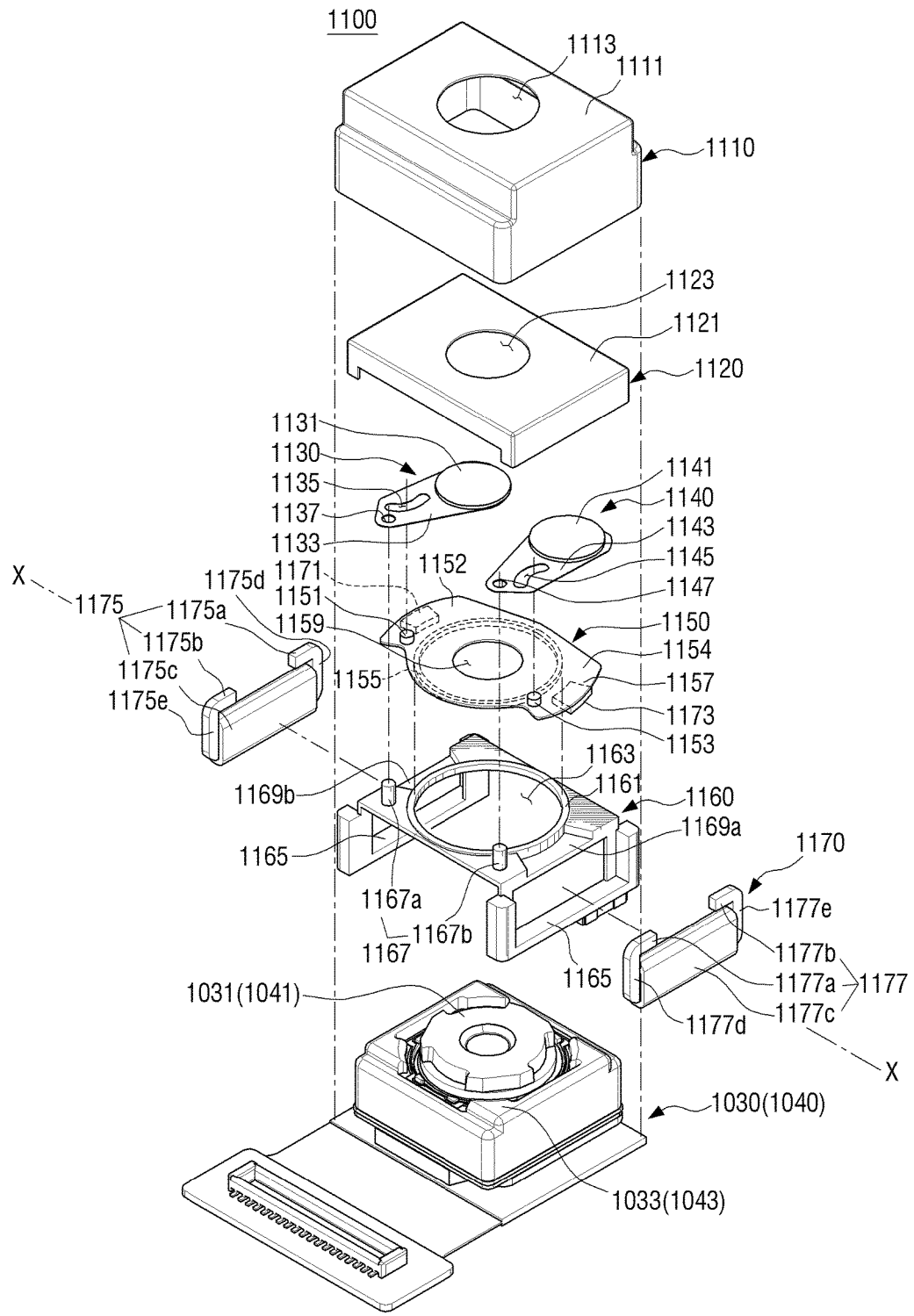
FIG. 14 is an exploded perspective view of a camera module including a filter switching device according to another exemplary embodiment of the present disclosure.
Figure 15:
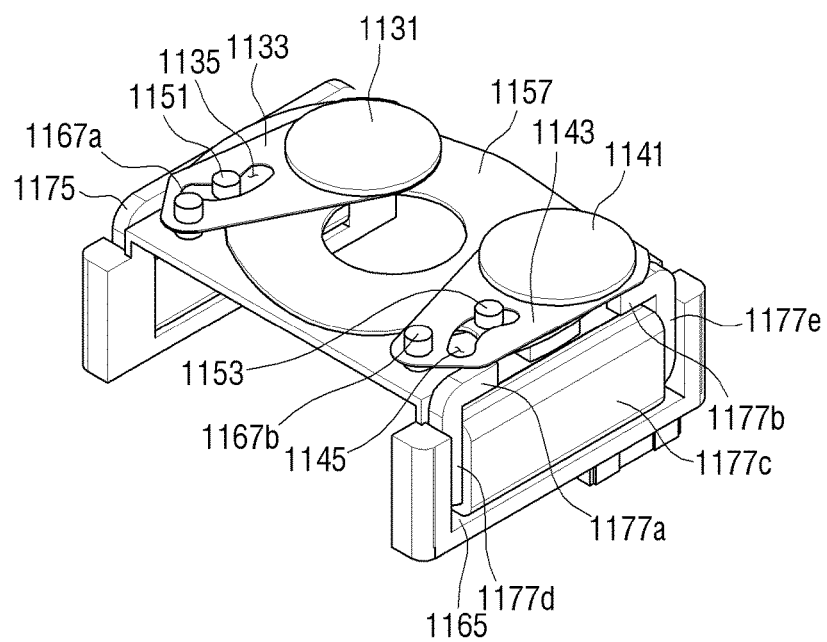
FIG. 15 is a perspective view illustrating a case in which covers are separated from the filter switching device according to another exemplary embodiment of the present disclosure.

FIG. 14 is an exploded perspective view of a filter switching device 1100 of a camera module including a filter switching device according to another exemplary embodiment of the present disclosure. FIG. 15 is a perspective view illustrating a case in which covers 1110 and 1120 are separated from the filter switching device 1100 of the camera module including the filter switching device according to another exemplary embodiment of the present disclosure.

Referring to FIGS. 14 and 15, the filter switching device 1100 of the camera module including the filter switching device include an outer cover 1110, an inner cover 1120, a first filter blade part 1130, a second filter blade part 1140, a rotor 1150, a base 1160, and a driving part 1170.

The outer cover 1110 is configured to surround the front camera module 1030 or the rear camera module 1040. The outer cover 1110, which has a rectangular parallelepiped shape, includes a front cover 1111 and a first light passing hole 1113. The front cover 1111 forms an outer surface in front of the filter switching device 1100 which is closest to the subject. The first light passing hole 1113 is formed in a circular shape in a central portion of the front cover 1111. The first light passing hole 1113 allows light of the subject to pass therethrough.

The inner cover 1120 is installed in rear of the front cover 111 and in front of the base 1160. The inner cover 1120 serves to surround and protect the filter blade parts 1130 and 1140 and the rotor 1150. A first cover 1121 corresponding to the front cover 1111 is also formed on the inner cover 1121, and a second light passing hole 1123 is formed in the inner cover 120 so that the light of the first light passing hole 1113 passes therethrough. Preferably, a cover glass (not shown) may be installed in the second light passing hole 1123 of the inner cover to protect the filter blade parts 1130 and 1140 and the rotor 1150. It is also possible to integrally form the inner cover 1120 with the outer cover 1110. Accordingly, an assembling process of the filter switching device 1110 may be simplified.

The first filter blade part 1130 may be installed to rotate at a predetermined angle about a reference shaft 1167a of the base 1160. The first filter blade part 1130 includes a first filter 1131, a first filter blade 1133, a first guide groove 1135, and a cam hole 1137.

The first 1131, which selectively cuts-off the light passing holes 1113 and 1123, may be formed of an infrared cut-off filter, a band-pass filter for recognizing an iris, or a glass without a filter. The first filter 1131 is formed in a circular shape and is positioned at one end of the first filter blade 1133.

The first filter blade part 1133 rotates in a clockwise direction or a counterclockwise direction by a first guide boss 1151 of the rotor 1150 which is rotated by the driving part 1170. The first filter blade 1133 is formed in a thin plate shape. The first filter 1131 is positioned at one end of the first filter blade 1133 and the cam hole 1137 coupled to the first reference shaft 1167a is provided to the other end thereof. The first filter blade 1133 rotates about the first reference shaft 1167a.

The first guide groove 1135 guides the first guide boss 1151 so as to be moved by a rotation of the rotor 1150. The first guide groove 1135 is formed in an arc shape having a predetermined width and a predetermined length, and is positioned between the first filter 1131 and the camp hole 1137. Here, the arc shape refers to a shape having a portion of circumference. The first and second guide grooves 1135 and 1145 are each formed at a predetermined distance toward the first and second filters 1131 and 1141 from each of the reference shafts 1167a and 1167b in the first and second filter blades 1133 and 1143.

The cam hole 1137 is positioned at the other end of the first filter blade 1133. The cam hole 1137 is formed in a circular hole so as to be coupled to the first reference shaft 1167a.

The second filter blade part 1140 may be installed to rotate at a predetermined angle about a reference shaft 1167b of the base 1160. The second filter blade part 1140 includes a second filter 1141, a second filter blade 1143, a second guide groove 1145, and a cam hole 1147.

Most of the configurations of the second filter blade part 1140 are the same as the configurations of the first filter blade part 1130. Therefore, a detailed description thereof will be omitted.

Meanwhile, according to the present exemplary embodiment, the guide grooves 1135 and 1145 may also be implemented in a linear shape, but are preferably implemented in an arc shape to prevent interference or collision with the first filter 1131 and the second filter 1141.

The first and second filter blade parts 1130 and 1140 simultaneously rotate. Accordingly, in a case in which the first filter 1131 of the first filter blade part 1130 is positioned on the light passing holes 1113 and 1123, the second filter 1141 of the second filter blade part 1140 is not positioned on the light passing holes 1113 and 1123. Similarly, in a case in which the second filter 1141 of the second filter blade part 1140 is positioned on the light passing holes 1113 and 1123, the first filter 1131 of the first filter blade part 1130 is not positioned on the light passing holes 1113 and 1123.

The first and second filter blade parts 1130 and 1140 are formed at the same height. Accordingly, since an overall height of the filter switching device 1100 according to the present disclosure may be reduced as compared to the related art in which a plurality of filter blades are formed in a vertical direction, it is possible to implement the filter switching device 1100 in a compact configuration.

The cam holes 1137 and 1147 of the first and second filter blade parts 1130 and 1140 are formed at one side of an X-X axis of the base 1160. Accordingly, since the first and second filter blade parts 1130 and 1140 interfere with each other, the filter switching device 100 may be stably used for a long period of time without minor breakdowns.

The rotor 1150 rotates the first and second filter blade parts 1130 and 1140. The rotor 1150 includes a first guide boss 1151, a second guide boss 1153, a first rotation ring 1155, a rotation plate 1157, and a light hole 1159 (also referred to as a corresponding hole or a light corresponding hole).

The first guide boss 1151 is positioned at one side of a top surface of the rotation plate 1157, that is, near the first reference shaft 1167a. The second guide boss 1153 is positioned at the other side of the top surface of the rotation plate 1157, that is, near the second reference shaft 1167b. The first and second guide bosses 1151 and 1153 moves along the first guide groove 1135 and the second guide groove 1145, respectively.

The first rotation ring 1155 is formed on a bottom surface of the rotor 1150. The first rotation ring 1155 has a predetermined width and a predetermined thickness, and is configured to be guided and rotated in the guide ring 1161 of the base 1160.

The rotation plate 1157 is rotated by the driving part 1170. The rotation plate 1157 has a central portion of a circular shape and includes magnet coupler 1152 and 1154 of a quadrangular shape at both ends thereof in a direction of a virtual X-X axis. The first and second guide bosses 1151 and 1153 are formed on a top surface of the rotation plate 1157, and the first rotation ring 1155 is formed on a bottom surface thereof. Magnets 1171 and 1173 are each formed on the magnet coupler 1152 and 1154 of the rotation plate 1157.

The light hole 1159 is formed in a circular shape in the central portion of the rotation plate 1157 so as to pass light through a diameter smaller than the first rotation ring 1155.

The base 1160 forms a lower portion of the filter switching device 1100. The base 1160 includes a guide ring 1161, a light hole 1163, an electromagnet mounting part 1165, a reference shaft 1167, and magnet accommodating parts 1169a and 1169b.

The guide ring 1161 is formed on the base 1160. The guide ring 1161 is formed in a donut shape, and may have a predetermined thickness and a predetermined width. The guide ring 1161 is formed to be greater than a radius than the first rotation ring 1155 to guide the first rotation ring 1155.

Although the present exemplary embodiment illustrates that the guide ring 1161 is formed to have the predetermined thickness on the base 1160 for convenience of explanation, the guide ring 1161 is preferably formed at the same height as the base 1160. Since the filter switching device 1100 may be configured to be thinner than the case in which the guide ring 1161 has the predetermined thickness, by the configuration of the guide ring 1161 which is formed at the same height as the base 1160 and the configuration of the thin rotation plate 1157, the filter switching device 1100 may be optimized for a mobile product which is thinned.

The light hole 1163 has a circular shape which is formed by the guide ring 1161. The light hole 1163 may guide light of the subject to the camera modules 1030 and 1040.

Electromagnets 1175 and 1177 may be mounted on the electromagnet mounting part 1165. The electromagnet mounting part 1165 may be configured in a shape of 'ㄷ', but is not limited thereto, and any configuration may be possible as long as the electromagnets 1175 and 1177 may be mounted thereon. The camera module 1030 and 1040 include lens transfer parts 1033 and 1043 that perform a zooming or a focusing by transferring the lens parts 1031 and 1041 in an optical axis direction.

The reference shaft 1167 is formed at one side of an upper portion of the base 1160. The reference shaft 1167 includes a first reference shaft 1167a and a second reference shaft 1167b. The reference shaft 1167 may be coupled to the camp holes 1137 and 1147 of the first and second filter blade parts 1130 and 1140. The reference shaft 1167 may be formed in a cylindrical shape so that circular-shaped cam holes 1137 and 1147 may be coupled thereto. The reference shaft 1167 is formed at one side of a virtual X-X axis of the base 1160. That is, the first reference shaft 1167a is positioned near one end portion 1175b of the electromagnet 1175, and the second reference shaft 1167b is positioned near the other end portion 1177a of the electromagnet 1177.

The magnet accommodating parts 1169a and 1169b freely rotate the magnets 1171 and 1173 so as not interfere with a top surface of the base 1160. The magnet accommodating parts 1169a and 1169b are formed at both side ends of the top surface of the base 1160, and are formed in a rectangular shape about the virtual X-X axis.

The driving part 1170 is configured to rotate the rotor 1150. The driving part 1170 includes the magnets 1171 and 1173, and the electromagnets 1175 and 1177.

The magnets 1171 and 1173, which are permanent magnets, may be formed on top surfaces and bottom surfaces of the magnet coupler 1152 and 1154 of the rotor. Preferably, the magnets 1171 and 1173 may be disposed on only the bottom surfaces of the magnet couplers 1152 and 1154 so that any one polarity is disposed between both ends 1175a, 1175b, 1177a, and 1177b, and an opposite polarity is disposed at portions of the magnet couplers 1152 and 1154 which are close to the light hole 1159. By such a configuration, the height of the filter switching device 1100 may be reduced while the blades 1133 and 1143 and the magnets 1171 and 1173 do not interfere with each other.

Figure 16:
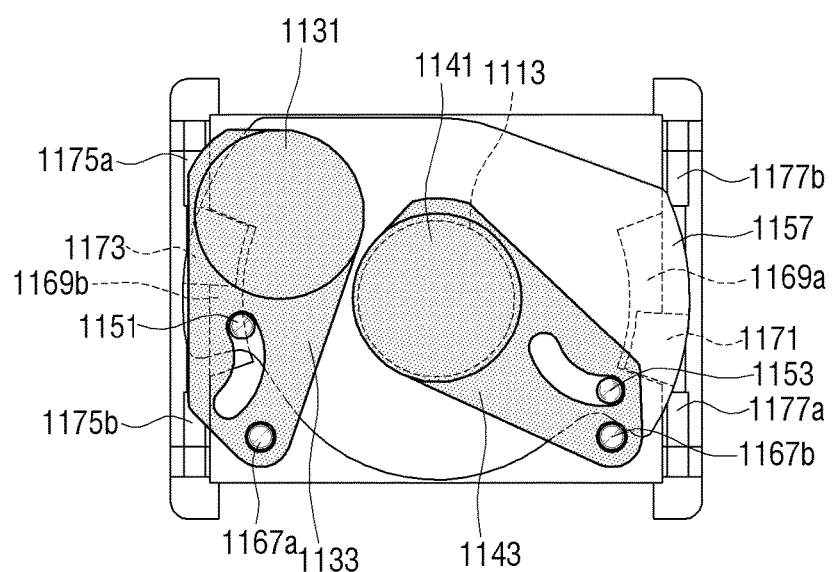
FIG. 16 is a plan view illustrating a case in which a second filter is positioned on a light passing hole in the filter switching device of FIG. 15.
Figure 17:
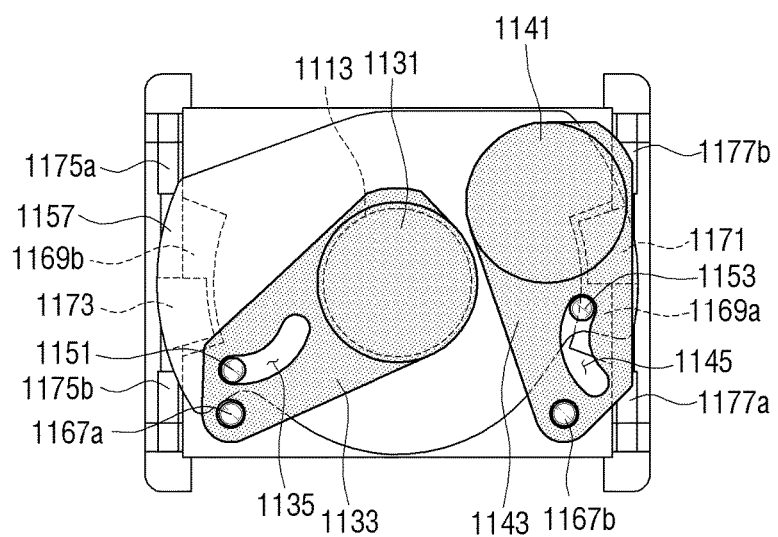
FIG. 17 is a plan view illustrating a case in which a first filter is positioned on the light passing hole in the filter switching device of FIG. 15.

The electromagnets 1175 and 1177 are formed in a substantially U shape. The electromagnets 1175 and 1177 are configured so that both ends 1175a, 1175b, 1177a, and 1177b thereof are each spaced apart from magnets 1171 and 1173. Specifically, both ends 1177a and 1177b of the electromagnet 1177 are positioned to be spaced apart from a trajectory of the magnet 1173 which is rotated by a blade 1154 of the rotor 1150, by a predetermined distance. Therefore, an interval of a case in which the magnet 1173 faces a first end 1177a of the electromagnet 1177 as illustrated in FIG. 16 and an interval of a case in which the magnet 1173 faces a second end 1177b of the electromagnet 1177 as illustrated in FIG. 17 are the same as each other. A relationship between the magnet 1171 and the electromagnet 1175 of the other side is operated in the same way as a relationship between the magnet 1173 and the electromagnet 1177.

U-shaped yokes 1175d, 1175e, 1177d, and 1177e of the electromagnets 1175 and 1177 are formed of a magnetic material such as iron, and coils 1175c and 1177c are wound around the center of each of the yokes 1175d, 1175e, 1177d, and 1177e. Therefore, when a current is applied to the coils 1175c and 1177c, the U-shaped yokes 1175d, 1175e, 1177d, and 1177e of the electromagnets 1175 and 1177 are magnetized to apply attractive force or repulsive force to each of the magnets 1171 and 1173. Here, the end portions 1175a, 1175b, 1177a, and 1177b of each of the yokes 1175d, 1175e, 1177d, and 1177e may be formed to face the magnets 1171 and 1173 while having the same area as each other and as wide as possible.

Hereinafter, an operation of the filter switching device 1100 according to another exemplary embodiment of the present disclosure having the structure as described above will be described with reference to FIGS. 15 to 17. Hereinafter, for convenience of explanation, it is assumed that the filter switching device 1100 is installed in the front camera module 1030, the band-pass filter is used as the first filter 1131, and the infrared cut-off filter is used as the second filter 1141. In addition, the magnets 1171 and 1173 may be coupled to one side of the magnet couplers 1152 and 1154 in an axis direction which is parallel to an optical axis. For convenience of explanation, it is illustrated that polarities of upper portions of the magnets 1171 and 1173, that is, a direction toward the subject in the axis direction which is parallel to the optical axis, are S poles, and polarities of lower portions of the magnets 1171 and 1173, that is, a direction opposite to the direction toward the subject with respect to the axis which is parallel to the optical axis, are N poles. In addition, it is illustrated that both ends 1175a, 1175b, 1177a, and 1177b of the electromagnets 1175 and 1177 face the N poles of the magnets 1171 and 1173.

In a general case, the infrared cut-off filter 1141 is positioned on the light passing hole 1113 as illustrated in FIG. 16.

In this state, when the iris recognition is performed for identification, or the like, an iris recognition mode is selected. A method for selecting an iris recognition mode may be illustrated as follows. When a user executes a camera application on the display 1011 of the smartphone 1001, a screen capable of selecting a camera mode is output to the display 1011. Accordingly, the user may touch the display 1011 to select the iris recognition mode. Here, when the user selects the iris recognition mode on the display 1011, the filter switching device 1100 operates in the iris recognition mode.

Other than the method for selecting the iris recognition mode using the camera application described above, the iris recognition mode may be selected by a dedicated button or key, and since such methods are known methods, a detailed description thereof will be omitted.

In the case of FIG. 16, one end 1177b of the electromagnet 1177 is magnetized to the N pole, and the other end 1177a thereof is magnetized to the S pole. One end 1175b of the electromagnet 1175 of an opposite side is magnetized to the N pole, and the other end 1175a thereof is magnetized to the S pole. Accordingly, one end 1177b of the electromagnet 1177 pushes the magnet 1171 facing each other by the N pole, and the other end 1177a of the electromagnet 1177 attracts the magnet 1171 facing each other by the N pole. The electromagnet 1175 of the opposite side also applies attractive force and repulsive force to the magnet 1173 in the same principle as the electromagnet 1175. Accordingly, the infrared cut-off filter 1141 is positioned on the light passing hole 1113, and the band-pass filter 1131 deviates from the light hole 1159.

In a case in which the iris recognition mode starts in this state, the controller (not shown) causes a current to flow in a direction opposite to the coils 1175c and 1177c of the electromagnets 1175 and 1177. One end 1177b of the electromagnet 1177 is magnetized to the S pole, and the other end 1177a thereof is magnetized to the N pole. One end 1175b of the electromagnet 1175 of an opposite side is magnetized to the S pole, and the other end 1175a thereof is magnetized to the N pole. Accordingly, one end 1177b of the electromagnet 1177 attracts the magnet 1171 facing each other by the N pole, and the other end 1177a of the electromagnet 1177 pushes the magnet 1171 facing each other by the N pole. One end 1175b of the electromagnet 1175 of the opposite side is magnetized to the S pole to attract the magnet 1173 facing each other by the N pole, and the other end 1175a of the electromagnet 1175 is magnetized to the N pole to push the magnet 1173 facing each other by the N pole.

By the magnetization of both ends of 1175a, 1175b, 1177a, and 1177b of the electromagnets 1175 and 1177 described above, the rotation plate 1157 rotates as illustrated in FIG. 17. In this case, the first guide boss 1151 formed on the rotation plate 1157 about the reference shaft 1167a is guided by the guide groove 1135, so that the first filter blade 1133 rotates in a clockwise direction. The second guide boss 1153 formed on the rotation plate 1157 about the reference shaft 1167b is guided by the guide groove 1145, so that the second filter blade 1143 rotates in a counterclockwise direction. In this case, the guide groove 1135 is formed to have a predetermined length, so that both ends 1175a, 1175b, 1177a, and 1177b of the electromagnets 1175 and 1177 and the magnets 1171 and 1173 are not in contact with each other and may maintain a state in which they are spaced apart from each other by a predetermined distance.

Accordingly, the first filter 1131 having the band-pass filter is positioned on the light passing hole 1113, and the second filter 1141 having the infrared cut-off filter is positioned at a position which deviates from the light passing hole 1113. By such an arrangement, the smartphone 1001 recognizes the iris, thereby making it possible to perform identification.

When the user again selects a general photographing mode, that is, a mode in which the infrared cut-off filter is positioned on the light passing hole 1113, from the iris recognition mode, the controller (not shown) again applies a current of an opposite direction to the coils of the electromagnets 1175 and 1177. Accordingly, as illustrated in FIG. 16, the second filter 1141 having the infrared cut-off filter is positioned on the light passing hole 1113, and the first filter 1131 having the band-pass filter is positioned at a position which deviates from the light passing hole 1113. In the general photographing mode, since the infrared cut-off filter cuts-off the infrared rays and transmits only the visible rays in the day time, image quality may be improved.

According to the present disclosure as described above, the user may perform the photographing according to a purpose by selectively controlling the band-pass filter or the infrared cut-off filter as needed. In addition, the first filter may be the infrared cut-off filter or a general glass other than the band-pass filter, and the second filter may also be the general glass or the band-pass filter other than the infrared cut-off filter.

Although not illustrated, the first filter 1131 or the second filter 1141 may have a first lens or a second lens which corresponds to each of the first and second filters and is provided to the same position as the first filter or the second filter.

For example, in a case in which the second filter 1141 is the band-pass filter, a narrow-angle lens is provided together with the second filter, thereby making it possible to more precisely perform the photographing of the iris.

Hereinafter, a case in which the rotor includes the rotation ring, not the rotation plate, will be described by way of example, according to still another exemplary embodiment of the present disclosure.

Figure 18:
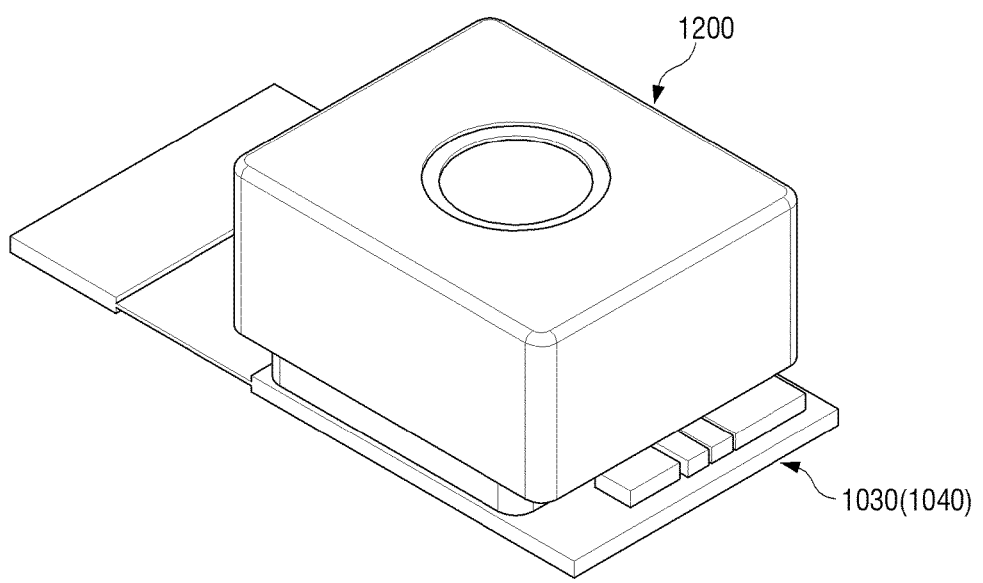
FIG. 18 is a perspective view illustrating a camera module including a filter switching device used for a mobile device according to still another exemplary embodiment of the present disclosure.
Figure 19:
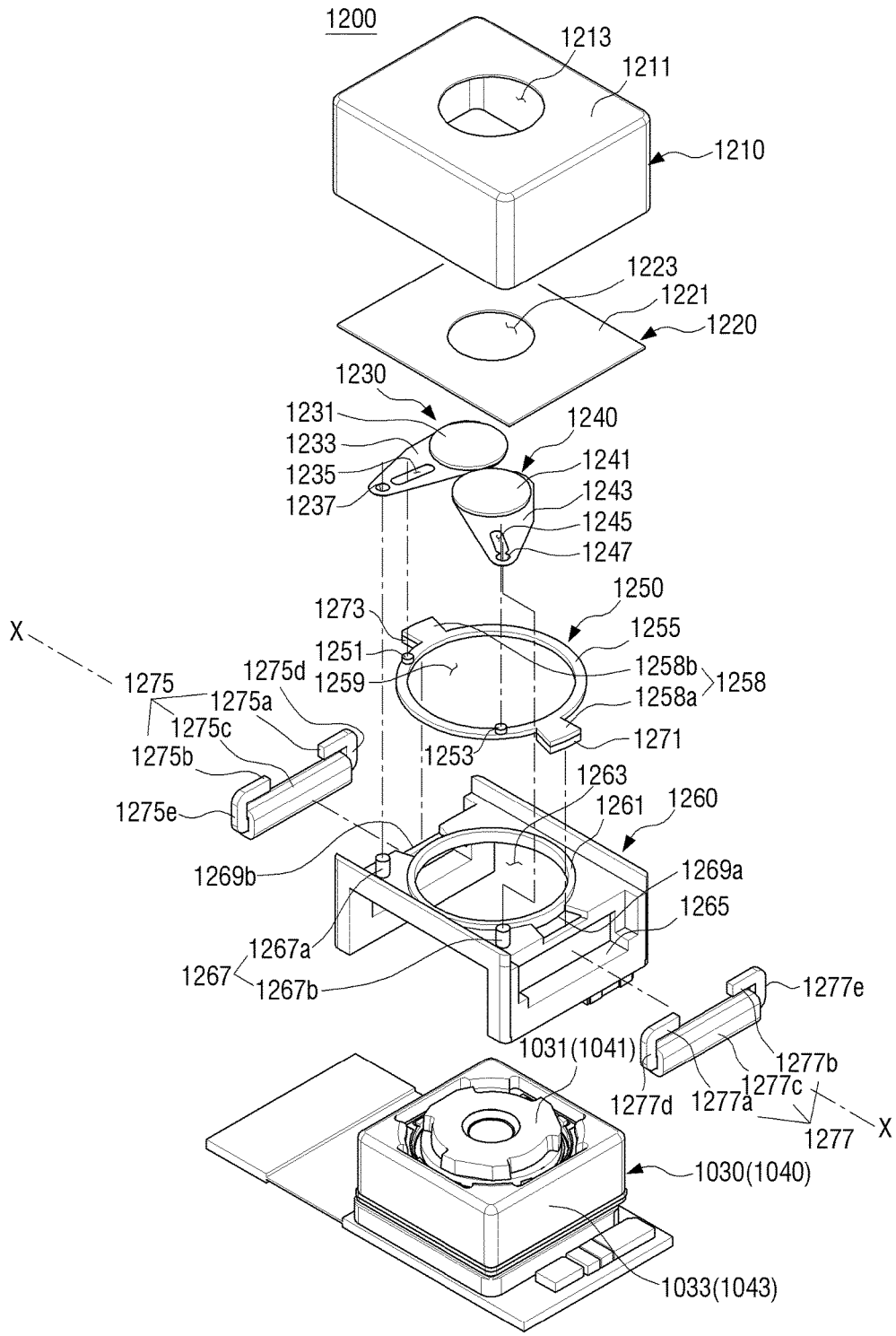
FIG. 19 is an exploded perspective view of a camera module including a filter switching device according to still another exemplary embodiment of the present disclosure.
Figure 20:
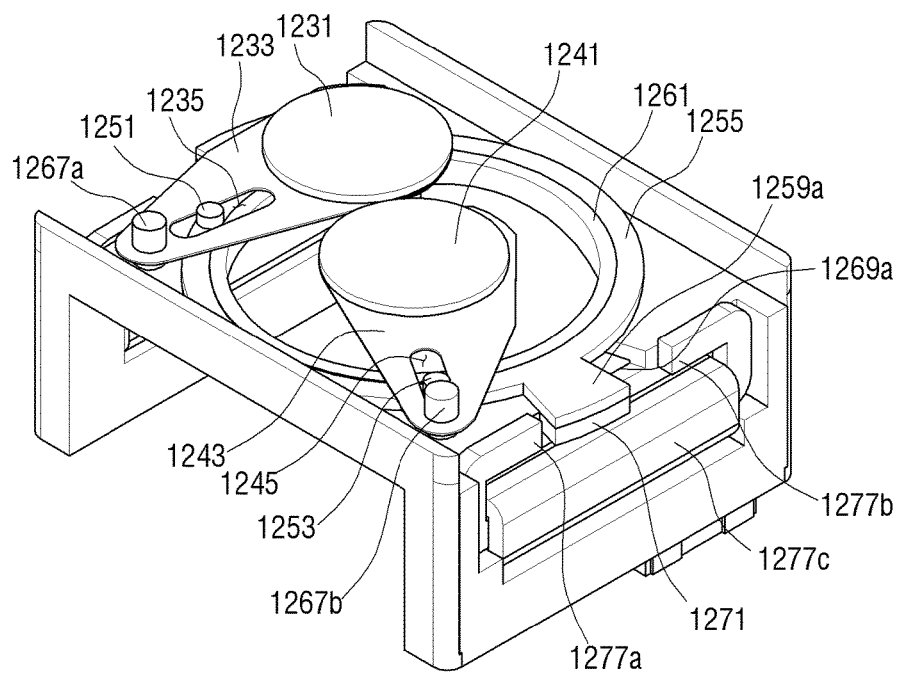
FIG. 20 is a perspective view illustrating a case in which a cover is separated from the filter switching device according to still another exemplary embodiment of the present disclosure.
Figure 21:
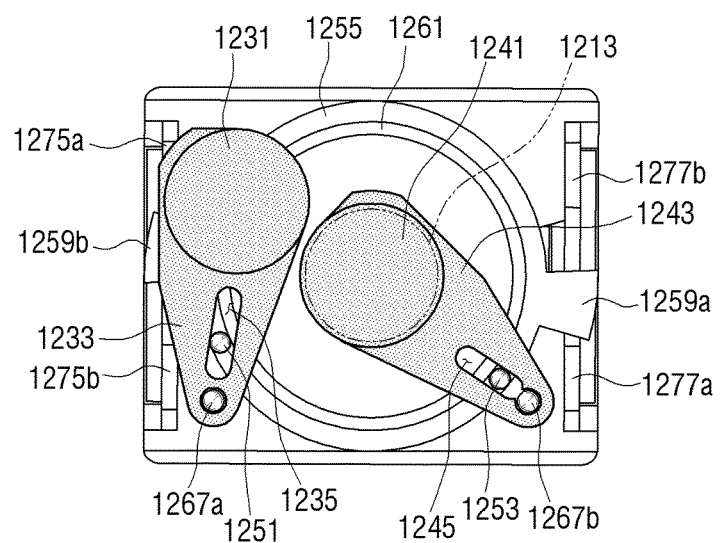
FIG. 21 is a plan view illustrating a case in which a second filter is positioned on a light passing hole in the filter switching device of FIG. 20.
Figure 22:
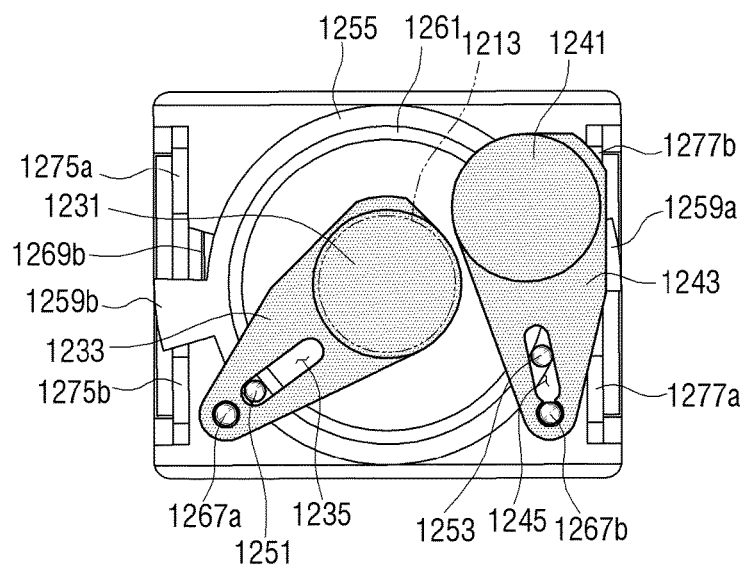
FIG. 22 is a plan view illustrating a case in which a first filter is positioned on a light passing hole in the filter switching device of FIG. 20.

FIG. 18 is a perspective view illustrating a camera module including a filter switching device used for a mobile device according to still another exemplary embodiment of the present disclosure and FIG. 19 is an exploded perspective view of the camera module including the filter switching device of FIG. 18. FIG. 20 is a perspective view illustrating a case in which a cover is separated from the filter switching device of FIG. 18 and FIG. 21 is a plan view illustrating a case in which a second filter is positioned on a light passing hole in the filter switching device of FIG. 20. FIG. 22 is a plan view illustrating a case in which a first filter is positioned on a light passing hole in the filter switching device of FIG. 20.

Referring to FIGS. 18 to 20, a filter switching device 1200 of a camera module including the filter switching device according to another exemplary embodiment of the present disclosure include an outer cover 1210, an inner cover 1220, a third filter blade part 1230, a fourth filter blade part 1240, a rotor 1250, a base 1260, and a driving part 1270.

According to the present exemplary embodiment, since most of the configurations other than configurations of guide grooves 1235 and 1245, the rotor 1250, and a guide ring 1261 are the same as the configurations of the filter switching device 1100 according to the exemplary embodiment described above, a detailed description thereof will be omitted. In another exemplary embodiment of the present disclosure, corresponding reference numerals are assigned to the configurations corresponding to those of the exemplary embodiment described above. Hereinafter, the configurations of the guide grooves 1235 and 1245, the rotor 1250, and the guide ring 1261 will be described in detail.

According to the present exemplary embodiment, the guide grooves 1235 and 1245 are linearly formed to have a predetermined width and a predetermined length. Accordingly, third and fourth guide bosses 1251 and 1253 formed on a second rotation ring 1255 may selectively position the third and fourth filters 1231 and 1241 on the light passing hole 1213 while linearly moving in the third and fourth guide grooves 1235 and 1245.

The rotor 1250 rotates the third and fourth filter blade parts 1230 and 1240. The rotor 1250 includes a third guide boss 1251, a fourth guide boss 1253, a second rotation ring 1255, a magnet coupler 1258, and a light hole 1259.

The third guide boss 1251 is positioned at one side of a top surface of the second rotation ring 1255, that is, near a third reference shaft 1267a. The fourth guide boss 1253 is positioned at the other side of the top surface of the second rotation ring 1255, that is, near a fourth reference shaft 1267b. The third and fourth guide bosses 1251 and 1253 moves along the third guide groove 1235 and the fourth guide groove 1245, respectively.

The second rotation ring 1255 occupies most of the rotor 1250 and is formed in a circular shape. The second rotation ring 1255 has a predetermined width and a predetermined thickness, and is configured to be guided and rotated outside the guide ring 1261 of the base 1260.

According to the present exemplary embodiment, since the second rotation ring 1255 is guided and rotated by the guide ring 1261 having a thin thickness and the third and fourth guide bosses 1251 and 1253 linearly moves along the third and fourth guide grooves 1235 and 1245, it is possible to accurately control the third and fourth filter blade parts 1230 and 1240. In addition, according to the present exemplary embodiment, there is advantage in that a consumption of a material is reduced and a volume is also reduced by the second rotation ring 1255 and the guide ring 1261 having the thin thickness, as compared to the rotation plate 1157 of the filter switching device 1100 described above.

Magnet couplers 1258 are provided to both ends of the second rotation ring 1255 in direction of a virtual X-X axis. Third and fourth magnets 1271 and 1273 may be coupled to magnet couplers 1258a and 1258b, respectively.

The light hole 1259 is formed in a circular shape in the central portion of the rotor 1250 so as to pass light through a diameter smaller than the second rotation ring 1255.

The guide ring 1261 is formed in a circular shape on the base 1260. The second rotation ring 1255 may rotate along an outer circumference of the guide ring 1261. The guide ring 1261 is preferably formed to have a minimum thickness so that the magnets 1271 and 1273 do not interfere with the base 1260 when the magnets 1271 and 1273 rotate.

An operation of the filter switching device 1200 according to still another exemplary embodiment of the present disclosure having the structure as described above will be described with reference to FIGS. 21 and 22.

According to the present exemplary embodiment, since most of the operations other than operations of the guide grooves 1235 and 1245, the rotor 1250, and the guide ring 1261 are the same as the operations of the filter switching device 1100 according to the exemplary embodiment described above, a detailed description thereof will be omitted.

By magnetization of both ends 1275a, 1275b, 1277a, and 1277b of the electromagnets 1275 and 1277, the second rotation ring 1255 rotates as illustrated in FIGS. 21 and 22. In this case, the third guide boss 1251 formed on the second rotation ring 1255 about the reference shaft 1267a is guided by the guide groove 1235, so that the third filter blade 1233 rotates in a clockwise direction. The fourth guide boss 1253 formed on the second rotation ring 1255 about the reference shaft 1267b is guided by the guide groove 1245, so that the fourth filter blade 1243 rotates in a counterclockwise direction. In this case, the guide groove 1235 is formed to have a predetermined length, so that both ends 1275a, 1275b, 1277a, and 1277b of the electromagnets 1275 and 1277 and the magnets 1271 and 1273 are not in contact with each other and may maintain a state in which they are spaced apart from each other by a predetermined distance.

Also in the present exemplary embodiment, the third filter 1231 and the fourth filter 1241 may be formed of the band-pass filter, the infrared cut-off filter, and the general glass according to a desired mode.

Figure 23A:
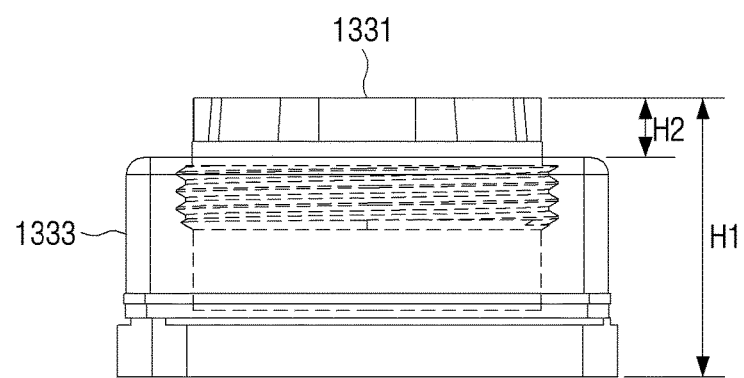
FIG. 23A is a side view illustrating a camera module according to the present disclosure in which a height of a lens transfer part is lower than a lens part.
Figure 23B:
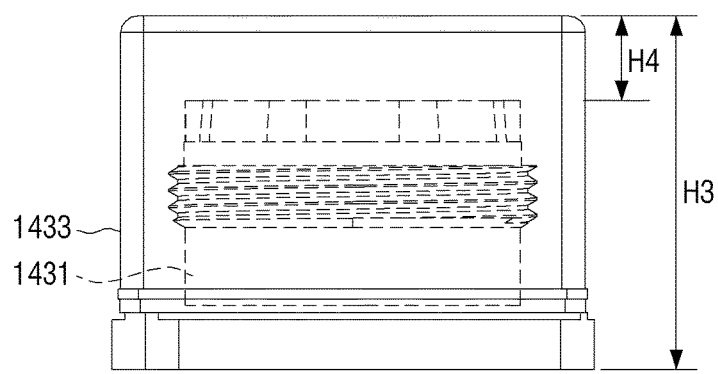
FIG. 23B is a side view illustrating a camera module according to the related art in which a height of a lens transfer part is higher than a lens part.

FIG. 23A is a view illustrating a camera module according to the present disclosure applied to the mobile device in which a height of a lens transfer part is lower than a lens part and FIG. 23B is a view illustrating a camera module according to the related art in which a height of a lens transfer part is higher than a lens part.

Referring to FIG. 23B, according to the related art, a height of a lens transfer part 1433 is H3 from a lowest end of the camera module, and an interval between an upper end of a lens part 1431 and the lens transfer part 1433 is H4. In addition, a stroke region of the lens part 1431 is equal to or smaller than H4. Accordingly, according to the related art, since the lens transfer part 1433 is higher than the lens part 1431, the camera module could not be implemented in a small size. In addition, in a case in which the configuration such as the filter switching device is applied to a front surface of the lens part 1431, since there is no empty space between the lens part 1431 and the lens transfer part 1433, an additional volume according to H4 was required.

Referring to FIG. 23A, in the camera module applied to the mobile device according to the present disclosure, a height from the lowest end of the camera module to an initial position of a lens part 1331 is H1, and an interval between a lens transfer part 1333 and the initial position of the lens part 1331 is H2. By such a configuration, the lens part 1331 is formed to form a step with a front surface of the lens transfer part 1333. Here, the initial position refers to a position at which an interval between the lens part 1331 and the uppermost portion of the lens transfer part 1333 is minimal when the lens part 1331 moves to adjust a focus.

The lens transfer part 1333 according to the present disclosure has a height which is lower than the lens part 1331. That is, in a case in which an additional configuration such as the filter switching device is applied to the front surface of the camera module, the lens transfer part 1333 is formed to have the height which is lower than the front surface of the lens part 1331 based on the initial position of the lens part 1331 to secure a space of the filter switching device. Accordingly, since the camera module according to the present disclosure may be implemented in entirely low and compact configuration, the camera module is easily applied to the mobile device having many height and size constraints.

In addition, even in a case in which the stroke region of the lens part 1331 according to the present disclosure is formed in the same way as the conventional camera module according to FIG. 23B, an empty space is formed on an upper portion of the lens transfer part 1333, the initial position of the lens part 1331, and both sides of the stroke region. Such a space may be utilized as a space in which the electromagnet of the filter switching device is positioned or for the driving of the camera such as the rotation of the magnet. Accordingly, the camera module according to the present disclosure may have improved efficiency of a space use, and may not interfere with other members when the magnet, or the like of the driving part of the filter switching device rotates.

As described above, although the present disclosure has been described with reference to the embodiments and the accompanying drawings, it is to be understood that the present disclosure is not limited thereto, and various variations and modifications may be made by those skilled in the art without departing from the spirit and scope of the present disclosure as defined by the appended claims.

That is, a configuration in which one or more filters horizontally move by one driving part while not interfering with each other and are switched may be regarded as belonging to the scope of the present disclosure.

The invention claimed is:

1. A filter switching device used for a camera module, the filter switching device comprising:
   a base configured to have a light passing hole formed in the base;
   a filter blade part configured to be rotatably coupled to a reference shaft of the base and include at least one filter; and
   a driving part configured to rotate the filter blade part by magnetic force,
   wherein the filter blade part rotates by a predetermined angle in a first direction or a second direction opposite to the first direction to change a photographing mode,
   wherein the filter blade part includes:
   a filter blade configured to have the at least one filter disposed at one end of the filter blade; and
   a cam hole configured to be formed at the other end opposite to the one end of the filter blade and rotatably coupled to the reference shaft,
   wherein the driving part includes:
   a magnet configured to be provided to the other end of the filter blade; and
   an electromagnet configured to have both ends disposed to be adjacent to the magnet, wherein the magnet is positioned to be adjacent to the reference shaft, and
   wherein the electromagnet includes a coil in which a current selectively flows; and a yoke having the coil disposed at a portion of the yoke and selectively magnetized by the coil, the yoke being formed in a bent shape so that portions at which both ends of the electromagnet are disposed and the portion at which the coil is disposed are each disposed on different surfaces of the base.

2. The filter switching device as claimed in claim 1, wherein the filter blade part includes a first filter and a second filter,
   when the filter blade part rotates by the predetermined angle in the first direction, the first filter is set to a position corresponding to the light passing hole, and
   when the filter blade part rotates by the predetermined angle in the second direction, the second filter is set to the position corresponding to the light passing hole.

3. The filter switching device as claimed in claim 2, wherein the first filter is any one of an infrared cut-off filter, a band-pass filter, and a glass, and
   the second filter is any one of the infrared cut-off filter, the band-pass filter, and the glass, which is different from that of the first filter.

4. The filter switching device as claimed in claim 1, wherein both ends of the electromagnet are formed to correspond to an outer circumference surface of the magnet.

5. The filter switching device as claimed in claim 1, wherein the driving part rotates the filter blade part by attractive force or repulsive force with the magnet according to a change in polarities of both ends of the electromagnet.

6. The filter switching device as claimed in claim 1, wherein the magnet is divided into an N pole and an S pole at a boundary of a virtual plane including a central axis of the reference shaft.

7. The filter switching device as claimed in claim 1, wherein the at least one filter moves on a circumference of a virtual circle having the reference shaft as a center and having a diameter from the reference shaft to a center of the light passing hole.

8. A mobile device including a camera module, the mobile device comprising:
   the filter switching device as claimed in claim 1,
   wherein the filter switching device is included in the camera module.

9. The mobile device as claimed in claim 8, wherein the camera module includes a lens transfer part and a lens part that forwardly moves and backwardly moves along the lens transfer part, and
   the filter switching device is disposed in front of the camera module.

10. The mobile device as claimed in claim 9, wherein the lens transfer part is formed at a height which is lower than a front surface of the lens part based on an initial position of the lens part to secure a space in which the driving part of the filter switching device rotates, and forms a step with a front surface of the lens transfer part.

11. A filter switching device used for a camera module of a mobile device, the filter switching device comprising:
   an upper cover configured to have a light passing hole formed in the upper cover;
   a first filter blade part configured to be installed to rotate at a predetermined angle about a first reference shaft of a base and include a first filter covering the light passing hole;
   a second filter blade part configured to rotate simultaneously with the first filter blade part about a second reference shaft of the base at the same height as the first filter blade part and to include a second filter covering the light passing hole;
   a rotor configured to be each connected to the first and second filter blade parts, and to rotate in a clockwise direction or a counterclockwise direction about the light passing hole to simultaneously rotate the first and second filter blade parts;
   a driving part configured to rotate the rotor by magnetic force; and
   a base configured to guide the rotation of the rotor and to accommodate the driving part,
   wherein when the rotor rotates in the clockwise direction, any one of the first and second filters covers the light passing hole, and
   when the rotor rotates in the counterclockwise direction, the other of the first and second filters covers the light passing hole.

12. A filter switching device used for a camera module, the filter switching device comprising:
   an upper cover configured to have a light passing hole formed in the upper cover;
   a filter blade part configured to include at least a first filter and a second filter;
   one driving part configured to horizontally move the filter blade part; and
   a base configured to accommodate the one driving part,
   wherein the filter blade part is connected to the one driving part so that the first filter and the second filter are disposed on the light passing hole while not interfering with each other, wherein the filter blade part includes:
a filter blade configured to have the first filter and second filter disposed at one end of the filter blade; and
a cam hole configured to be formed at the other end opposite to the one end of the filter blade and rotatably coupled to a reference shaft,
wherein the driving part includes:
a magnet configured to be provided to the other end of the filter blade; and
an electromagnet configured to have both ends disposed to be adjacent to the magnet, wherein the magnet is positioned to be adjacent to the reference shaft, and
wherein the electromagnet includes a coil in which a current selectively flows; and a yoke having the coil disposed at a portion of the yoke and selectively magnetized by the coil, the yoke being formed in a bent shape so that portions at which both ends of the electromagnet are disposed and the portion at which the coil is disposed are each disposed on different surfaces of the base.

13. The filter switching device as claimed in claim 12, further comprising a lens configured to be disposed at the same position as at least one of the first filter or the second filter.

14. A filter switching device used for a camera module, the filter switching device comprising:
an upper cover configured to have a light passing hole formed in the upper cover;
a filter blade part configured to include at least a first filter and a second filter;
one driving part configured to horizontally move the filter blade part;
a based configured to accommodate the one driving part; and
a lens configured to be disposed at the same position as at least one of the first filter or the second filter,
wherein the filter blade part includes:
a filter blade configured to have the first filter and the second filter disposed at one end of the filter blade; and
a cam hole configured to be formed at the other end opposite to one end of the filter blade and rotatably coupled to a reference shaft,
wherein the driving part includes:
a magnet configured to be provided to the other end of the filter blade; and
an electromagnet configured to have both ends disposed to be adjacent to the magnet, wherein the magnet is positioned to be adjacent to the reference shaft, and
wherein the electromagnet includes a coil in which a current selectively flows; and a yoke having the coil disposed at a portion of the yoke and selectively magnetized by the coil, the yoke being formed in a bent shape so that portions at which both ends of the electromagnet are disposed and the portion at which the coil is disposed are each disposed on different surfaces of the base.

15. The filter switching device as claimed in claim 14, wherein the lens is a narrow angle lens.

* * * * *